United States Patent [19]

Moon et al.

[11] Patent Number: 4,669,004
[45] Date of Patent: May 26, 1987

[54] HIGH CAPACITY DISK FILE WITH EMBEDDED SECTOR SERVO

[75] Inventors: Ronald R. Moon, Santa Clara; Michael G. Machado, San Jose; Thomas G. Cooper, Palo Alto; Patrick M. Weiher, Los Altos; Curtis H. Bruner, Los Gatos; Mark E. Strysko, Sunnyvale; Gregg J. Uhlendorf, San Jose; Steven G. Campbell, San Jose; Tuong T. Quan, San Jose; Hoa V. Luong, Milpitas, all of Calif.

[73] Assignee: Quantum Corporation, Milpitas, Calif.

[21] Appl. No.: 834,009

[22] Filed: Feb. 27, 1986

[51] Int. Cl.⁴ .......................... G11B 5/55; G11B 5/56
[52] U.S. Cl. ........................................ 360/77; 360/78
[58] Field of Search .................................. 360/77, 78

[56] References Cited

U.S. PATENT DOCUMENTS

| | | | |
|---|---|---|---|
| 3,997,876 | 12/1976 | Frush | 340/172.5 |
| 4,157,577 | 6/1979 | Porter, Jr. et al. | 360/77 |
| 4,185,269 | 1/1980 | Hodges et al. | 340/146.1 AL |
| 4,195,320 | 3/1980 | Andresen | 360/78 |
| 4,218,742 | 8/1980 | Carlton et al. | 364/200 |
| 4,314,291 | 2/1982 | Oda et al. | 360/78 |
| 4,333,117 | 6/1982 | Johnson | 360/78 |
| 4,352,131 | 9/1982 | Van Herk et al. | 360/78 |
| 4,390,912 | 6/1983 | Hertrich et al. | 360/78 |
| 4,398,228 | 8/1983 | Bauck | 360/77 |
| 4,424,543 | 1/1984 | Lewis et al. | 360/135 |
| 4,454,549 | 6/1984 | Pennington | 360/77 |
| 4,488,142 | 12/1984 | Franaszek | 340/347 DD |
| 4,488,187 | 12/1984 | Alaimo | 360/77 |
| 4,511,938 | 4/1985 | Betts | 360/77 |
| 4,516,177 | 5/1985 | Moon et al. | 360/77 |

OTHER PUBLICATIONS

C. C. Liu, "Quad-Burst Servo Pattern", IBM Technical Disclosure Bulletin, vol. 22, No. 12, May 1980, pp. 5436-5438.
W. A. Herrington and F. E. Mueller, "Quad-Burst PES Systems for Disk File Servo", IBM Technical Disclosure Bulletin, vol 21, No. 2, Jul. 1978, pp. 804-805.
D. H. Pennington and A. A. Recupero "Digital Sector Servo System", IBM Technical Disclosure Bulletin, vol. 22 No. 6, Nov. 1979, pp. 2476-2481.

Primary Examiner—George G. Stellar
Attorney, Agent, or Firm—David B. Harrison

[57] ABSTRACT

A high performance, low cost rotating disk data storage subsystem includes a head and disk assembly. A plurality of sectors in data tracks include a servo portion containing a prerecorded pattern of a plurality of repeating, time staggered, non-phase-coherent bursts, each burst having a predetermined integral fraction radial offset relative to the other bursts and having a constant frequency preamble field followed by a unique value field related to its burst spatial location. A head is positionable relative to the tracks in response to information derived from a servo portion, a programmed microcontroller supervisor for receives operational data storage and retrieval commands from a host system with which the subsystem is operationally associated and controls the position of the head during track seeking and following operations in response to servo information read by the head from each servo portion and further in response to the commands, an interface under the control of the microcontroller supervisor receives the commands and data blocks from the host system and for sending commands, status words and data blocks to the host system, a data sequencer and memory controller under the control of the microcontroller manages flow of data blocks to and from the disk via the head and stores the information read by the head means from said unique value fields for subsequent processing by the microcontroller. A servo burst pattern providing phase quadrature and absolute position information, a servo writer, a servo qualification area and a timer, a media defect management method, an amplitude measurement circuit, and a time division control program for the microcontroller are aspects of this invention.

52 Claims, 24 Drawing Figures

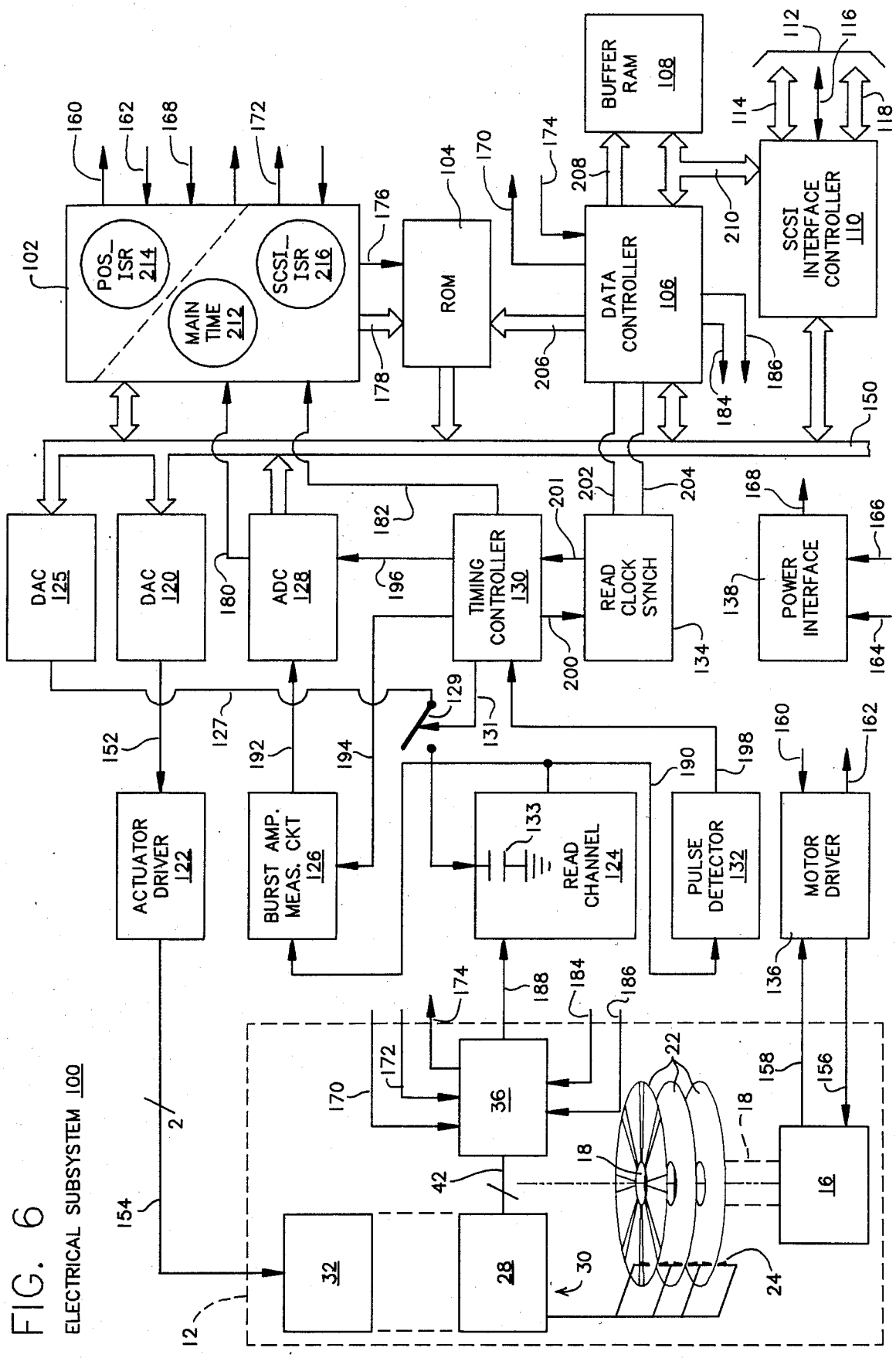
FIG. 6 ELECTRICAL SUBSYSTEM 100

FIG. 8
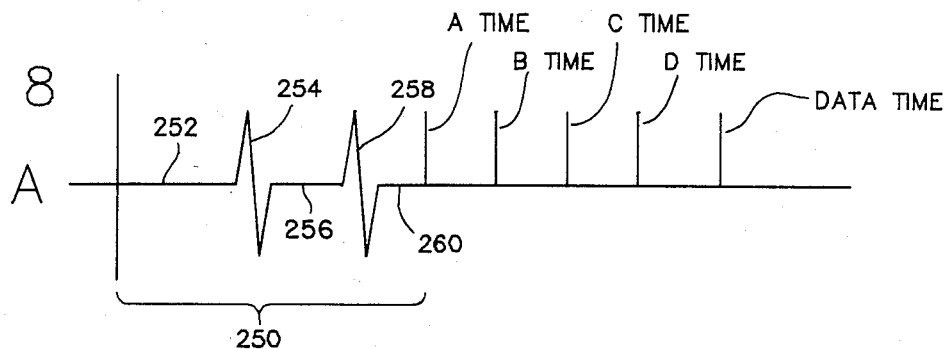
B  Ex. I 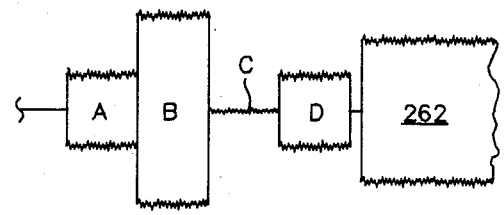
C  Ex. II 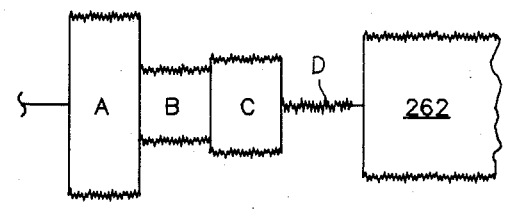
D  Ex. III 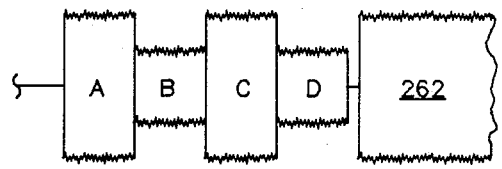
E  Ex. IV 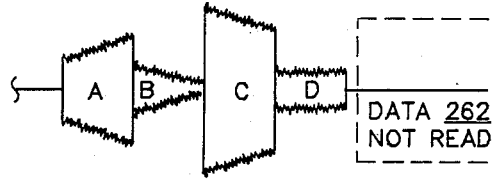
F  Ex. V 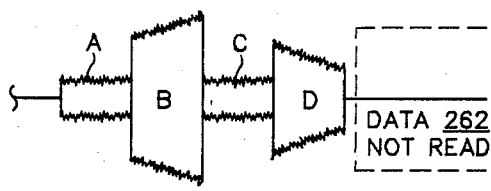

SERVO WRITER 400

HIGH CAPACITY DISK FILE WITH EMBEDDED SECTOR SERVO

FIELD OF THE INVENTION

The present invention is related to digital data storage equipment. More particularly, the present invention relates to a high capacity disk file peripheral data storage system employing an embedded sector servo for digital data storage and retrieval.

BACKGROUND OF THE INVENTION

Data storage devices employing rotating magnetic or optical media disks are known for high capacity, low cost storage. Such disks typically have a multiplicity of concentric data track locations, each capable of storing useful information. The information stored in each track is accessed by a transducer head which is moved among the tracks during track seeking operations and which is maintained in alignment with the track during read only and/or read/write track following operations of the device. The electro-mechanical assembly for rotating the disk relative to the head and for moving the head radially relative to the disk for track accessing purposes is known as the head and disk assembly (HDA). A control mechanism is provided in order to maintain the head within the boundaries of each data track, and may take the form of detents provided by a stepping motor, or by a continuously positionable actuator operating within a closed loop servo, or time sampled servo.

Until recently, most low cost, non-removable rigid magnetic media disk data storage devices utilized standard interfaces for connection of the HDA to a controller. The typical standard applicable to five and one quarter inch rotating fixed disks was established in the 1980 time frame by Seagate Technology, Inc., of Scotts Valley, Calif. That standard has been variously referred to as the "ST 506" as well as the "ST 412" interface. "ST 506" refers to the original five megabyte, five and one quarter inch diameter fixed disk drive offered by Seagate Technology, Inc.; while "ST 412" identified the four disk, ten megabyte product from the same source. Those particular drives employed an open loop stepper motor head actuator, and consequently, the interface for each drive was selected to be similar to the interface for five and one quarter inch open loop stepper motor based floppy disk data storage devices, in terms of form factor, power supply requirements, and some of the control signals, such as read/write, stepping pulses for moving the transducer head to a concentric data track of interest, etc. Because of widespread, immediate acceptance, the ST 506 interface has become a de facto industry standard for small fixed rotating disk data storage devices.

One drawback of the ST 506 interface standard was its requirement that each unformatted concentric data track be capable of containing approximately 10,416 bytes of data transferrable at a 5 megabit data rate in modified frequency modulation (MFM) format without interruption. This arrangement permitted the external controller to format (divide) the track into data records having a wide variety of lengths and data storage capacities. Since the amount, data rate and recording method of the data were fixed, the only ways to increase the overall storage capability of the disk drive were to add disk surfaces, or to move the concentric data tracks closer and closer together. As the data tracks were moved closer together, thermal gradients, and tolerances imposed e.g. by the manufacturing process and materials used in construction rendered open loop stepper motor positioner systems less and less reliable. With the requirement for higher track densities on the disk came a need for more precise positional feedback information from the one or more disk surfaces.

The assignee of the present invention pioneered the concept of a low cost, higher capacity disk drive having a single data masked servo sector on a data surface of a disk which was hidden in a speed tolerance gap provided just before the user index marker was sent to the device controller over the interface. Coarse track boundary information was provided by a detent-providing stepping motor or by an optical position encoder linked to the actuator structure. This approach, discussed in the assignee's U.S. Pat. No. Re 32,075, issued on Jan. 28, 1986, works very well for increasing track densities in low cost fixed disk data storage devices while maitaining compatibility with the popular, open loop based disk drive interface standards, such as the ST 506 standard.

The only other practical approach for increasing aerial track density without restricting the format of the data to be stored in each track is to devote an entire disk surface to the servo control process. The additional or "dedicated" servo surface is typically prerecorded with concentric servo tracks which are followed by a servo head whose sole task is to provide track following control information during read and write operations of the disk file. A principal drawback of a dedicated servo surface is its higher cost: it not only requires that an extra data storage surface and head be provided exclusively for handling the servo information (high cost components in low cost devices), but also requires separate read channel electronics for the servo loop. Performance may be enhanced and costs still kept low if an optical position encoder or other detent providing mechanism is used in conjunction with a dedicated servo surface prerecorded with a non-phase-coherent servo pattern. One very satisfactory high capacity, low cost disk file which advantageously combines these features is described in the assignee's U.S. Pat. No. 4,516,177.

One other prior approach worth mentioning is that of an embedded servo sector disk file. That approach, followed for some time by integrated high capacity, high performance, high cost disk file subsystems, has been found to be useful in interspersing servo information with user data on a disk surface. One drawback of some implementations of this embedded servo sector prior approach has been, for example, the requirement that velocity of the head assembly be carefully controlled and limited to a maximum value during track seeking operations so that the head reading the servo information will be in position to pass over each servo sector during the seeking operation, thereby enabling the servo sector to be read and head position to be determined. This strict position control requirement prevented the servo from losing track of the instantaneous position of the head, but degraded servo performance by calling for velocity limits during seek.

Another drawback of the prior embedded sector servo approach was the requirement for very precise servo writing systems for writing the embedded servo data in a manner in which each magnetic change of phase or transition (bit) written as a servo datum for a data track was coherently related to all other servo data. This severe servo writing requirement, which involved precision to the level of ten or less nanoseconds, significantly added to the cost of manufacture and therefore the drive itself.

A further drawback of the prior embedded sector servo approach lay with the various layouts of servo information prerecorded onto each data storage surface. Those patterns did not always provide reliable absolute position information or track centering information, and rarely did such patterns provide quadrature information which is very helpful in order to determine the radial direction of head transducer movement.

One more drawback of the prior art related to the various ways in which defects in the storage media were taken into account in order to minimize the resultant degradation of capacity or performance of the data storage device.

As can be seen by this summary of prior developments, a hitherto unsolved need has arisen for a low cost, high performance and capacity rotating disk data storage device which overcomes the limitations and drawbacks of the prior art.

SUMMARY OF THE INVENTION WITH OBJECTS

A general object of the present invention is to provide a low cost disk data storage subsystem which increases the amount of useful data which may be stored therein and which improves overall performance while reducing significantly the cost per bit of each bit stored.

A specific object of the present invention is to provide a data storage subsystem in which the data controller function is merged with a servo system operating and controlling the head and disk assembly in a manner which enables easily written servo data to be interspersed with user data so as to achieve a highly reliable servo system at low cost and with a minimum of disk data surface overhead and which enables more optimized compression of data for storage in the aerial data surface space available for useful data storage.

Another object of the present invention is to provide a uniquely robust layout pattern for servo head position control data which need not be phase coherent with other like servo data with which it cooperates for providing servoing information to a servo system.

A further object of the present invention is to provide an improved servo writing technique and apparatus for writing the non-phase coherent servo bursts of the invention with each appropriate data transducer of the disk file subsystem.

Yet another object of the present invention is to provide a more optimized repeating pattern of servo bursts in a manner which yields increased burst amplitudes, phase in quadrature relation and absolute position information during seeking operations for controlling position of a movable head transducer head in a disk file subsystem.

One further object of the present invention is to provide an improved servo control system and embedded servo burst pattern for a positionable head disk data storage file which provides absolute positional information in each servo burst readable through the same transducer head, data channel and data controller which operates for user data, thereby facilitating and vastly improving track seeking operations and performance.

One object of the present invention is to provide a qualification area immediately preceding each servo sector to which a timing controller circuit responds in order to provide reliable, precise timing information relating to the location of the servo sectors, thereby avoiding e.g. the expense and performance sluggishness of prior art optical or Hall effect index and sector marker detectors.

One still further object of the present invention is to provide an improved method for management of data sectors or blocks which are found to contain one or more media defects in a disk data storage file.

One more object of the present invention is to provide an improved disk data storage file having a low mass, compact in-line head transducer assembly driven by a powerful rotary actuator for more optimized operating performance characteristics.

Still one more object of the present invention is to provide a data storage disk file which is more readily manufacturable using fabrication automation with substantial improvement in yields in the manufacturing process, thereby contributing to reduction in overall costs of the file itself.

In one aspect, the present invention provides a high performance, low cost rotating disk data storage subsystem incorporating principles of the present invention includes a head and disk assembly comprising:

a storage disk rotatable at a controlled angular velocity and defining a series of concentric data tracks having a plurality of embedded servo sectors in the data tracks, the servo sector containing a prerecorded pattern of at least four servo bursts, each containing absolute track identification information and together providing positioning information for deriving two position signals in quadrature relationship, the pattern being immediately preceded by a special qualification area, a head structure being moveable relative to the tracks for reading data on the disk including the qualification area and the servo information, a programmed microcontroller supervisor for controlling and supervising data storage and retrieval operations of the subsystem including operation of the head structure and management of any media defects, a data sequencer and memory controller tightly coupled to and under the control of the microcontroller supervisor for managing flow of absolute position servo data and user data blocks to and from the disk via the head structure, for formatting data for storage and retrieval, and for verifying the integrity of, and correcting errors in data retrieved from the disk, a time sampled head position servo including the programmed microcontroller supervisor, head structure, and data sequencer and memory controller, the servo being responsive to the timing information in the qualification area and relative amplitudes and absolute positional information of the servo pattern and to data track select commands in order to move the head means from a departure track to a destination track during track seeking operations of the device and to maintain the head structure in substantial alignment with the centerline of a selected data track during track following operations of the device, an interface under the control of the microcontroller supervisor for receiving and executing commands, and for receiving data blocks from a host system, and for sending status words and data blocks to the host system.

In a detail of the first aspect of the present invention, the head structure is carried upon a damped, low mass compact in-line head assembly operated by an electromechanical memory actuator.

In accordance with a second aspect of the present invention, each servo sector includes four time sequential, radially staggered, non-phase-coherent bursts, each burst having a predetermined integral fraction spatial offset relative to the other bursts of a value less than one half track width in a dimension substantially perpendicular to centerlines of the tracks and each burst containing a unique value related to its spatial location, the pattern of bursts repeating itself beginning every fourth track. During track following operations of the device relative amplitudes of a first combination of some of the time staggered bursts is readable by the head structure for providing track centerline correction information for a particular track being followed, and relative amplitudes of a second combination of some of the time staggered bursts are also readable by the head structure for providing quadrature information relative to the first combination, the first and second combinations being determined by the servo system in relation to the track being followed. During track seeking operations of the device at least one burst is readable by the head structure when it is adjacent a sector in order to provide absolute data track identification to the servo system from the unique value, thereby enabling the servo system to ascertain absolute physical location of the head structure as it passes over each sector during the seeking operation.

In a more particular detail of the second aspect of the present invention, the first burst in the servo pattern is offset outwardly from a track centerline by one outward fractional increment, a second burst is offset from the track centerline by zero fractional increments, a third burst is offset from the track centerline by two outward fractional increments, and a fourth burst is offset from track centerline by one inward fractional increment, each increment preferably being one third track pitch (i.e. pitch is the distance between centerlines of adjacent data tracks).

In a third aspect of the present invention a quasi-phase coherent qualification area precedes each servo burst pattern, and a timing controller of the servo system responds to the signals present in the qualification area in order to generate time gating signals for processing of the servo bursts by the servo system. In a more particular detail of the third aspect, the qualification area includes for every other servo burst a first DC erase zone, a sector pulse dibit pair, a second DC erase zone, an echo pulse dibit pair and a third DC erase zone.

In a fourth aspect of the present invention an amplitude sensing circuit is provided for high speed sensing, holding and conversion to a digital value of the amplitude of each of a plurality of adjacent, radially staggered servo bursts.

In a fifth aspect of the present invention an improved method is provided for multi-tiered management of defects in the storage media.

In a sixth aspect of the present invention an improved servo writer and method uses a clock derived optically from a sector pattern provided on a disk clamp of the spindle hub of the disk file on which servo information is to be written. The servo writer eliminates errors such as electrooptical and spindle jitter and runout in writing each servo burst pattern in precisely proper time, position and phase relationship by use of the transducer of the disk drive itself during the servo writing operation.

These and other objects, advantages and features of the present invention will be more fully understood by considering the following detailed description of a preferred embodiment presented in conjunction with the accompanying drawings.

BRIEF DESCRIPTION OF THE DRAWINGS

In the Drawings:

FIG. 6 is an overall electrical block diagram of a disk file subsystem incorporating the head and disk assembly of FIG. 1 and in accordance with the principles of the present invention.

FIGS. 8A through 8F are waveform diagrams, waveform A illustrating gating signals used by the servo system of the FIG. 1 disk file subsystem to recover and process the servo bursts depicted in FIGS. 7A and 7B, waveforms B–D being associated with the head positions depicted in FIG. 7A, and waveforms E and F being associated with the head positions depicted in FIG. 7B.

DETAILED DESCRIPTION OF A PREFERRED EMBODIMENT

Overview of System 10

Figure 1:
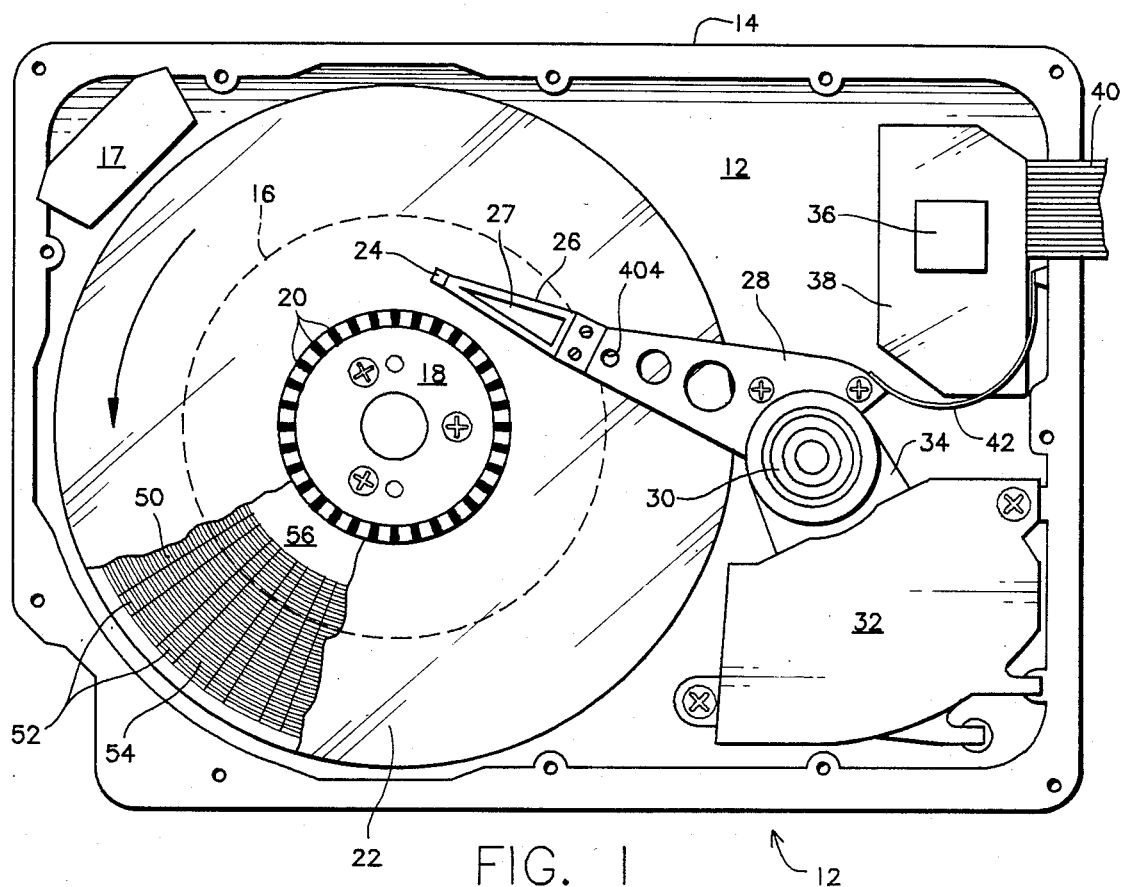
FIG. 1 is a somewhat diagrammatic top plan view of a head and disk assembly (cover removed) of a rotating non-removable disk peripheral data storage subsystem for digital computing equipment incorporating the principles of the present invention.
Figure 4:
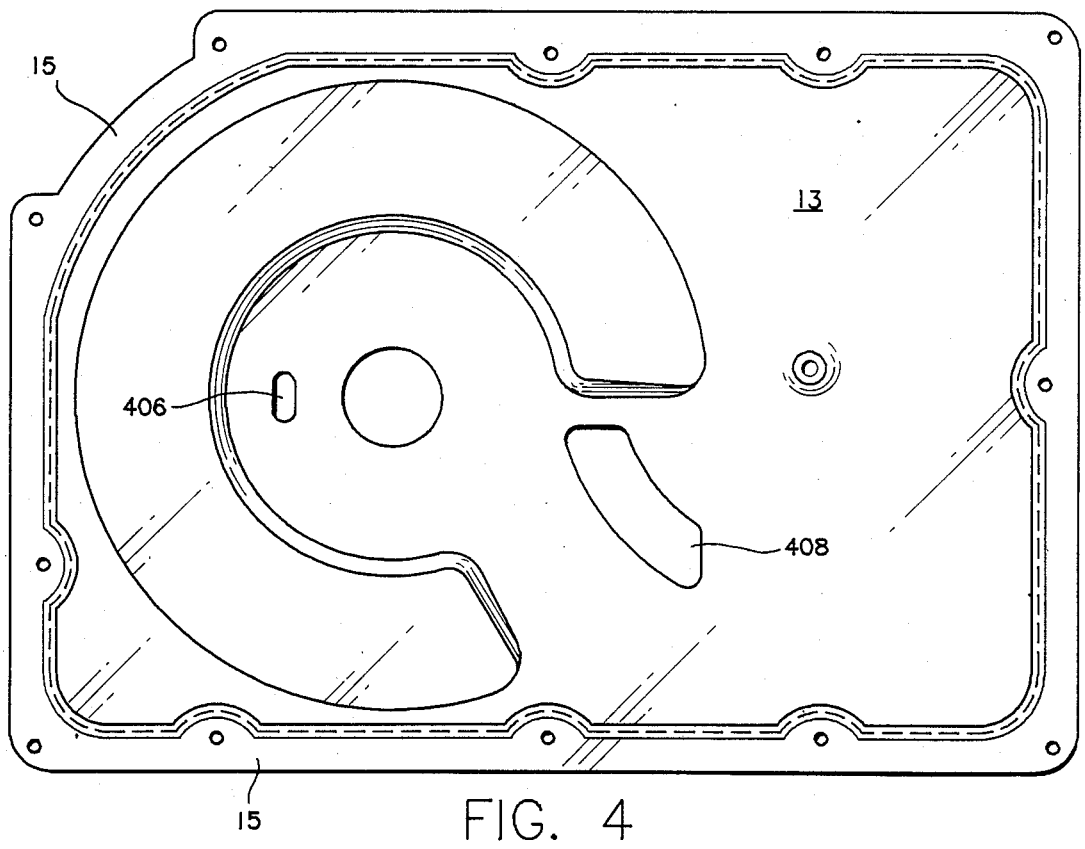
FIG. 4 is an inside plan view of a head and disk assembly cover for the subsystem depicted in FIG. 1.

A disk file subsystem 10 for attachment to and operation with e.g. a host digital computer system for data storage and retrieval purposes includes an electromechanical head and disk assembly (HDA) 12 as depicted in various aspects in FIGS. 1, 2, 3, 4 and 5. The assembly 12 includes a cover 13 (FIG. 4) secured to a base 14 which is e.g. sintered, cast formed and/or machined out of suitable material such as aluminum. The base 14 is sized to locate and secure all of the moving components of the system 10 and has sidewalls defining the form factor of a standard "half height" five and one quarter inch Winchester disk drive.

The cover 13 is provided with a rubber gasket 15 along its inside periphery. The gasket 15 contacts the smooth upper edge of four side walls of the base 12 to form an enclosed, airtight space which is kept substantially free of loose particle contamination, as is required by flying head ("Winchester") disk drive technology employed by the system 10. Bosses (not shown) positioned about the peripheral edges of the base walls limit the compression of the gasket 15. A filter 17 in an airflow path created by disk rotation within the base enclosure removes any loose particles to maintain purity of the interior ambient. A conventional breather filter in the cover 13 (not shown) equalizes internal pressures with the external ambient environment. A dissicant contained in a cannister (not shown) is provided inside the enclosure to absorb any excess moisture.

A three-phase direct drive brushless direct current spindle motor 16 is mounted to the base 14 and includes a rotating spindle or hub 18. The spindle motor 16 is electronically commutated, as will be explained hereinafter.

A pattern of alternating light reflective and dark matte areas forming sector marks 20 are formed at the outer, upper periphery of a disk clamp 19 secured to the hub 18. These marks are sensed electro-optically through a small hole in the HDA cover during the servo writing operation in the fabrication of the HDA 12 and are used to aid precision timing of the locations of e.g. 32 equally spaced apart qualification, servo information and user data sectors. More information relating to the servo writing step and apparatus is included hereinafter in connection with FIG. 12 in the "Servo Writer" section of this specification.

A plurality of non-removeable data storage disks 22 formed of rigid material such as aluminum plate are spaced apart by annular spacers 21 and are clamped to the hub 18. The disks 22 are rotated counterclockwise at a precisely controlled angular velocity by the spindle motor 16. Preferably, there are two or three thin aluminum disks 22 of 5.118" (130 mm) diameter, and they rotate at an angular velocity of 3662 RPM. The major surfaces of the disks 22 are coated with a thin film of magnetic storage media which is preferably applied through ion deposition (sputtering). The useful data (and the servo information) stored on each disk surface is written and read by a head transducer 24 which is formed as a precise slider of e.g. barium titanate ceramic material.

An in-line head suspension 26 secures each head 24 to a rotatable head support arm 28. The in-line arrangement substantially shortens each arm 28, thereby reducing the mass (and inertia) of the head support assembly, while leading to increased overall susceptibility of the assembly to head suspension resonances. To minimize such resonances, a small piece of damping material 27, such as double sided adhesive tape having a metal foil backing, is secured to each head suspension 26 to dampen vibrations otherwise resulting in instabilities in the head support assembly.

Further mass reductions are achieved by removing cylindrical plugs from the arm 28 as shown in FIG. 1. Reduced mass of the head support arms yields improvements in the speed of head positioning and access times between data tracks.

The head arms 28 are journalled relative to the base 14 by a dual bearing assembly of a rotary actuator 30. The assembly is secured to the base 14 and also to the cover 13. A spring (not shown) urges the two bearings against oppositely facing shoulder ends of the central actuator bore through the base 14. Another spring (not shown) urges the bearings against one side of the counterbore to prevent tilt of the actuator assembly in response to a physical shock or a thermal cycle. The actuator 30 includes a stator assembly 32 including two oppositely facing permanent magnets 35 carried on two flux return plates between which a moving coil 34 is sandwiched and freely rotatable within the limited range of angular displacement of the rotary actuator 30, in this instance, approximately twenty five degrees. The magnets 35 are premagnetized in a manner so that current passing through the single winding coil 34 in one direction causes the actuator 30 to move toward the hub 18, while current passing therethrough in the other direction causes the actuator 30 to move outwardly toward the periphery of the disks 22. The actuator's limited range of rotational movement is determined at the limits thereof by two crass stops 44 formed in the stator assembly 32 into which the coil 34 comes into contact.

Figure 2:
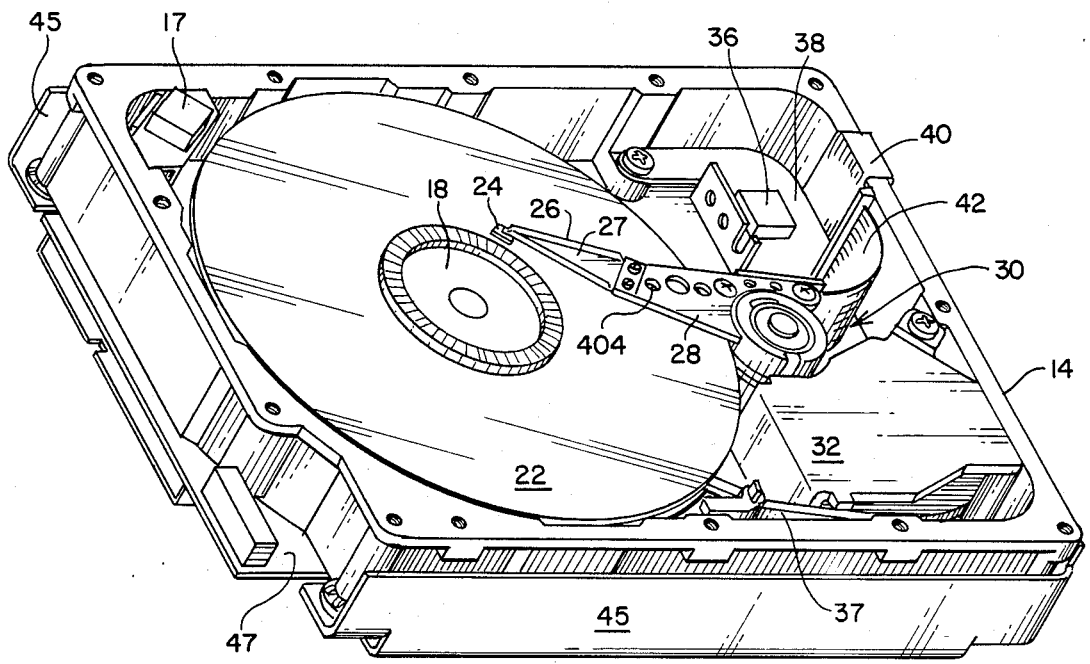
FIG. 2 is an orthogonal top view of the subsystem depicted in FIG. 1 with the cover removed.
Figure 5:
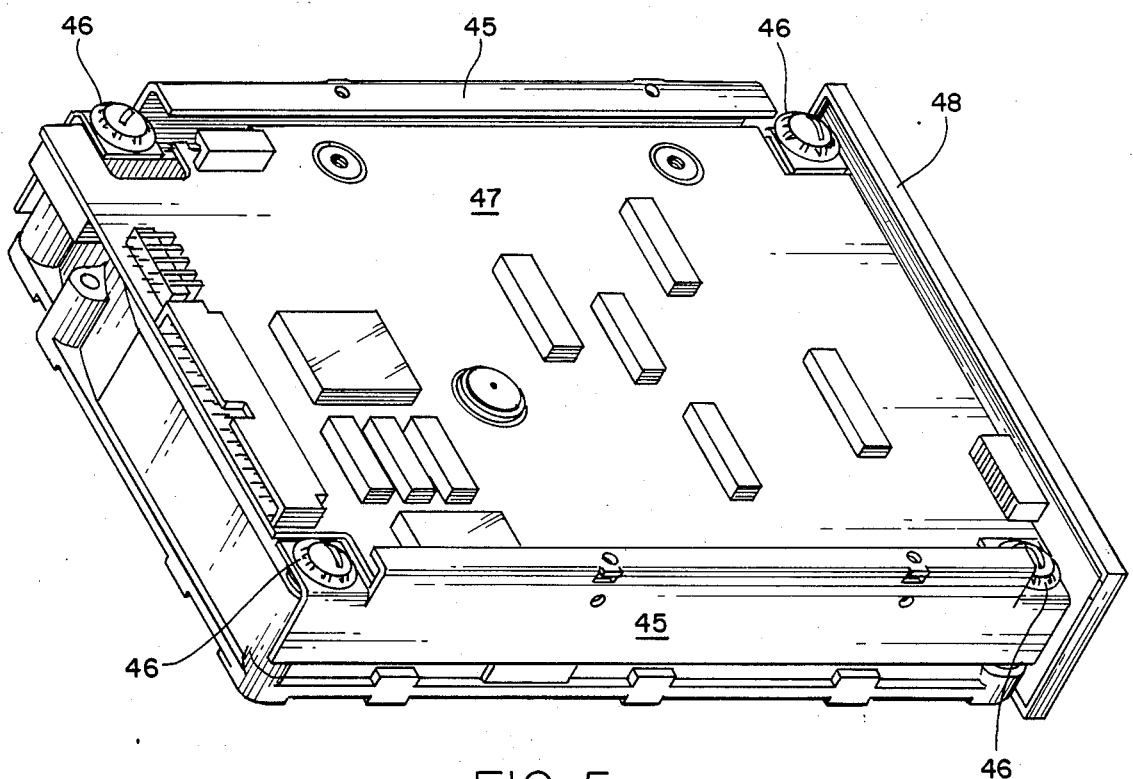
FIG. 5 is an orthogonal bottom view of the subsystem depicted in FIG. 1.
Figure 3:
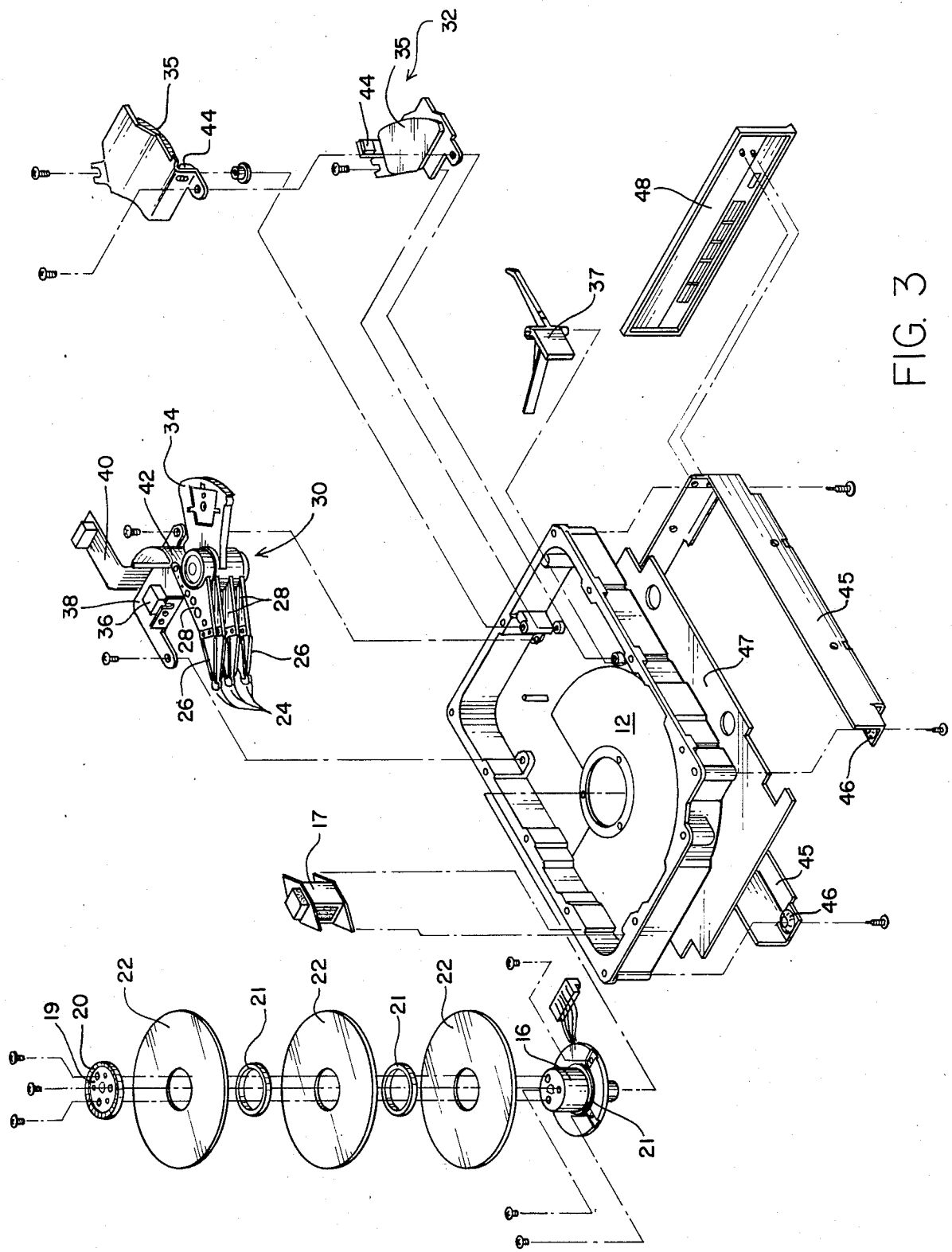
FIG. 3 is an exploded orthogonal assembly drawing of the subsystem depicted in FIG. 1.

A monolithic head select/interface circuit 36, such as a type SSI 501 manufactured by Silicon Systems, Inc., is connected to and carried by a thin polyimide film circuit substrate 38 which also carries and connects other components related to the circuit 36. An extension portion 40 of the substrate 38 carries a plurality of insulated conductive traces from the substrate 38 to other circuitry located outside of the head and disk assembly 12 by passing between the cover 13 and the rubber gasket 15 as shown in FIG. 2. The cable 40 carries the data, control and power signals required by the circuit 36 and it carries two current lines for the rotary actuator coil 34. A flexible extension 42 of the substrate 38 extends to the rotary actuator 30 and enables electrical connections to reach each of the data transducer heads 24.

An aerodynamically released shipping latch 37 may be provided to latch the head assembly to maintain the heads at an inner landing zone during power down conditions. A preferred form of latch is disclosed in U.S. patent application Ser. No. 755,840, filed on Sept.

13, 1985. The referenced application is owned by the assignee of the present invention, and the disclosure thereof is incorporated herein by reference. An electrodynamic return spring to return the head assembly to the landing zone may be readily provided by automatic circuitry for switching counter EMF generated by the spindle motor 16 into the rotary actuator 30 whenever primary power is removed from the system 10.

The base 14 is shock mounted to a support frame 45 by four shock mounts 46. A plastic end cover 48 may be provided for appearance and to facilitate mounting of the subsystem in a typical disk drive well of a host computing system.

Each surface of the disks 22 carries a multiplicity of spaced apart concentric data tracks 50. The track density achieved by the system 10 is approximately 876 tracks per radial inch of disk area, with head transducer widths of 0.75 mil, and flux densities of approximately 15,000 flux changes per inch within each track (decoded bit density being 20,000 bits per inch as measured at the innermost concentric data track 50). Each data track is divided up into e.g. thirty two equal sectors. With the disk rotation of 3662 RPM as specified, each sector is nominally 512 microseconds in duration.

Each sector includes a qualification and servo burst region 52 of approximately fifty microseconds in duration, followed by a user data region 54. Each user region is capable of holding 512 bytes of user data, and also overhead information, such as error correction code information and speed tolerance filler. Further details of the prerecorded pattern found in the qualification and servo burst regions is discussed herein under the heading "Sector Layout".

Figure 10:
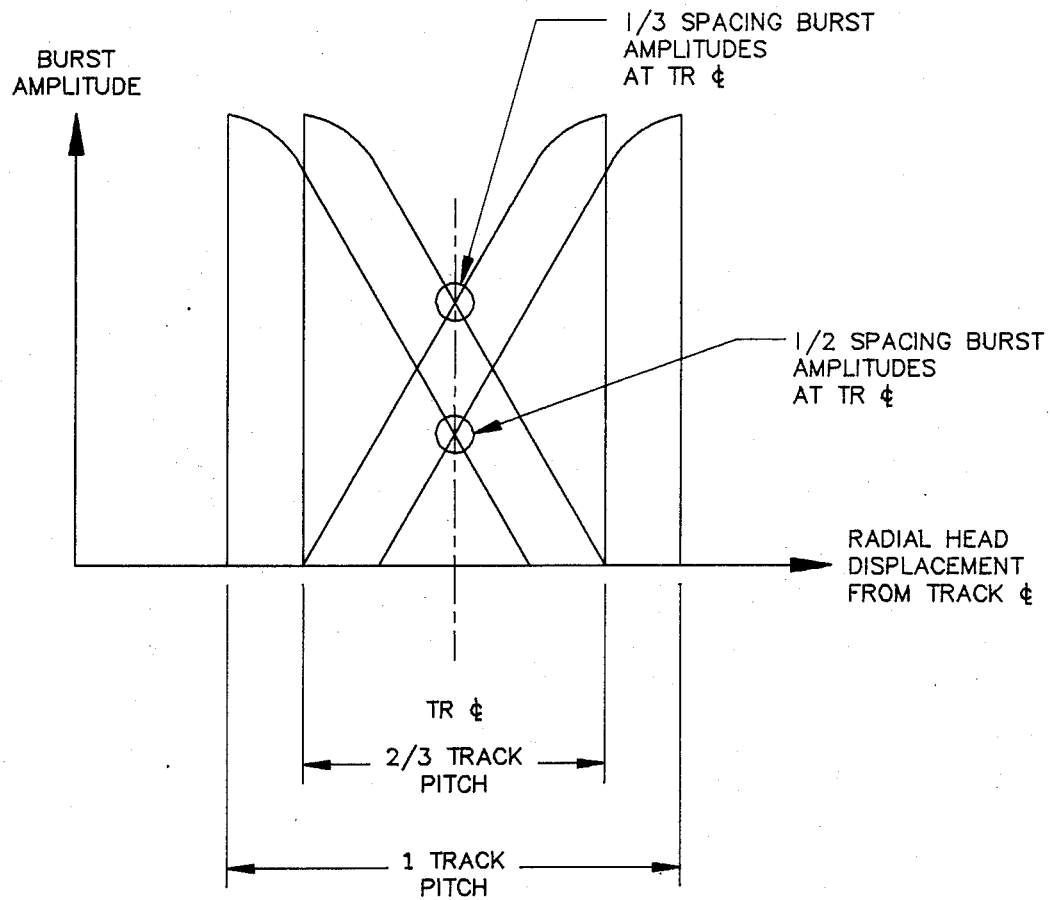
FIG. 10 is a plot of burst amplitude as a function of radial displacement of the transducer head, comparing a plot given for half track burst spacing with a plot for third track burst spacing, and illustrating the robustness of crossover amplitudes with third track spacing in accordance with the present invention.

In this preferred embodiment, with three data storage disks, approximately 80 megabytes of user data may be stored, and with two disks, approximately 53 megabytes may be stored. A graph of aerial layout of storage space on the disks is depicted in FIG. 10.

Electrical Subsystem 100

An electrical control portion 100 of the subsystem 10 is shown in FIG. 6. The circuit elements of this portion 100 (except for the head interface circuit 36) are preferably formed on a printed circuit card 47 (FIGS. 2, 3 and 5) which has the same length and width size dimensions as, and attaches to, the head and disk assembly 12. In FIG. 6 the major functional circuit elements of the electrical portion 100 include a monolithic microprocessor 102, such as Intel type 8031 operating with a clock cycle of 12 MHz under the control of a program stored in a program read only memory 104 having e.g. a 32 kilobyte storage capacity.

A data sequencer and memory controller 106, tightly coupled to and supervised by the microprocessor 102, manages data conversion between parallel and serial, compaction formatting (such as with a run length limited, variable length code e.g. 1,7), and actual placement of user data on the data tracks 50 and the movement of blocks of data to and from the tracks 50. The data controller 106 also provides memory addresses to address routines stored in the ROM 104 for the benefit of the microprocessor 102. The controller 106 carries out error correction activities in accordance with error correction codes generated and recorded in the postamble of each data block. A buffer memory 108 having 16 kilobytes of temporary storage capacity is used as a temporary storage area for blocks of user data as they are moved about in operation of the system 10 and also for temporary storage values developed during operation of the subsystem 10, such as those related to media defect management, discussed below. It should be observed that the microprocessor 102 obtains access to the buffer 108 through the memory controller 106, thus use of the memory 108 by the microprocessor 102 takes slightly longer than for memory directly accessible by the microprocessor 102.

An interface controller 110 is provided which is preferably of a type which interfaces disk file subsystems to a standard bus convention 112 known as SCSI, an acronym for Small Computer Systems Inerface (ANSI Document No. X3T9.2). This interface controller 110 includes a data bus 114, and a control bus 118. The interface controller 110 may be a standard integrated circuit such as type OMTI 5080 drive interface manufactured by Scientific Micro Systems, Inc., of Mountain View, Calif.

A high speed latching digital to analog converter 120, preferably type 0832 manufactured by National Semiconductor, receives digital control words from the microprocessor 102 and converts those words to analog current values which are sent to operate an actuator driver amplifier 122, functioning as a conventional H bridge amplifier. The amplifier 122, preferably type EL 2017 manufactured by Elantec, generates currents which are passed through the coil 32 of the rotary actuator 30 in order to move the head assembly from a departure track location to a destination track location during track seeking operations, and to maintain the head assembly in centerline alignment of a data track during track following operations.

A read channel 124 filters raw data read from the data tracks and received from the interface circuit 36 in order to remove unwanted artifacts such as high frequency noise spikes.

Figure 12:
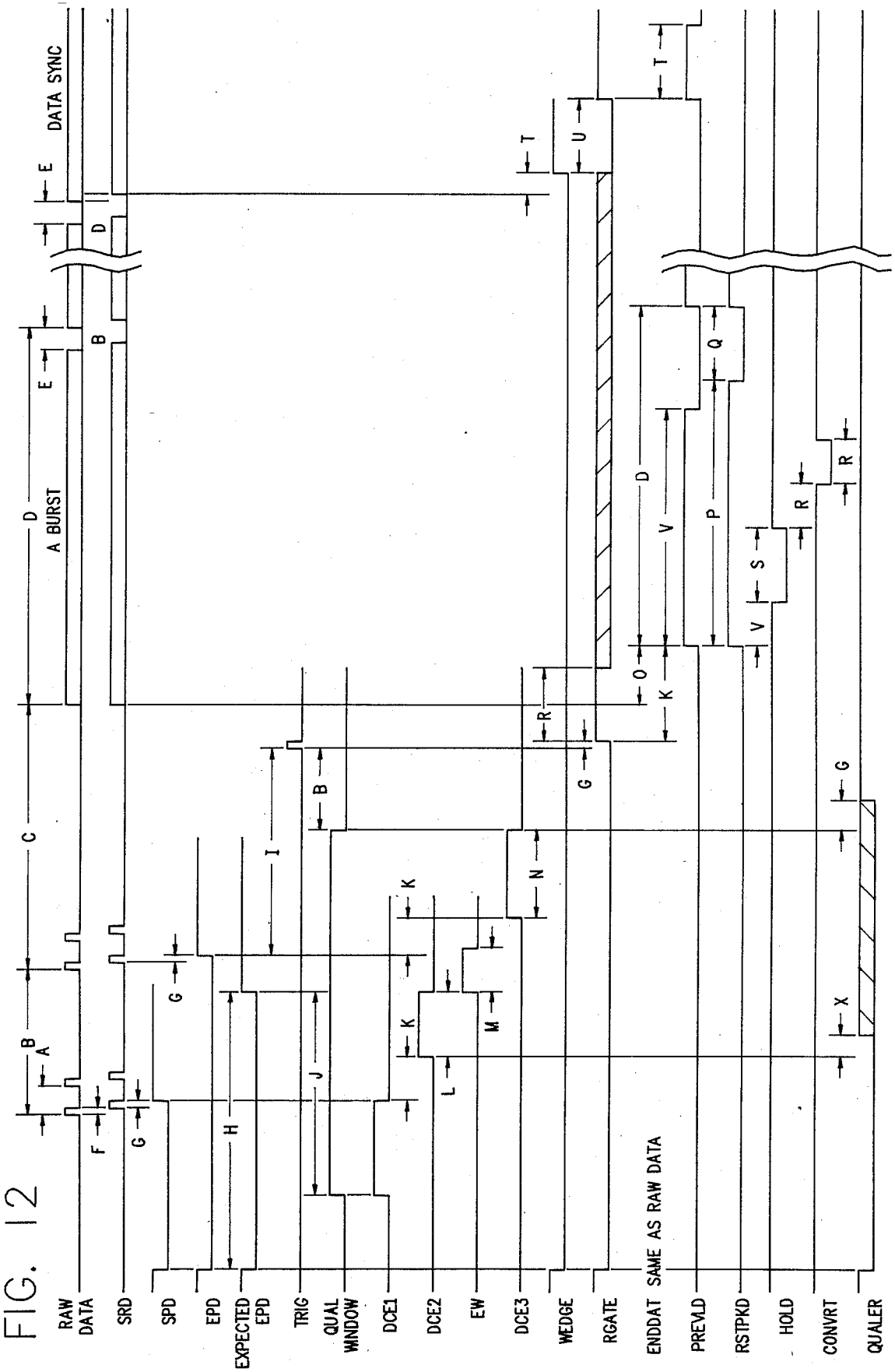
FIG. 12 is a timing diagram which is implemented within the timing controller of the FIG. 1 disk file subsystem.

A second, high speed digital to analog converter 125, similar to the converter 120, enables the processor 102 adaptively to control the gain of the read channel 124 during the time of each sector servo increment 52 (denoted by the WEDGE waveform in FIG. 12). A gain value is converted to a voltage by the converter 125, and is sent over a line 127 to a switch 129 which is closed during WEDGE time by a signal on a control line 131. Closure of the switch 129 forces the gain control voltage to be imposed on a capacitive element 133 of the read channel which otherwise stores an agc value for controlling the read channel during data read operations. This override feature is appropriate when it is remembered that during data write operations the read channel is inoperative, yet it must be operative during WEDGE time in order for the servo burst amplitudes and the absolute position information in each burst to be read and stored.

A burst amplitude measuring circuit 126 measures a value which is related to the amplitude of each of the time sequential, time sampled servo bursts within each sector. This circuit 126 is described hereinafter in the section headed "Burst Circuit 126", presented in conjunction with FIG. 13. Each amplitude value for each burst of the servo sector is converted into a digital value by a fast analog to digital converter 128, preferably type 7820 manufactured by Analog Devices.

A timing controller 130 responds to signals picked up by the head 24 in qualification areas immediately preceding each servo sector sequence, and it generates all of the timing signals needed to carry out the head position servoing function of the system 10. These timing signals are depicted in FIG. 12 and are described in connection with the "Sector Layout" section hereinafter.

A pulse or transition detector circuit 132 converts the raw data read from each selected track 50 into digital step functions. The detector circuit 132 contains a fixed gain detection threshold while reading data so as to provide positional feedback information for servoing during seeking and data write operations. A read clock synchronization circuit 134 separates a read clock signal from encoded data. The read channel 124 and the pulse detector circuit 132 are preferably implemented as a single integrated circuit, e.g. type DP 8464 manufactured by National Semiconductor, and the synchronization circuit 134 is another integrated circuit, e.g. type DP 8455 also manufactured by National Semiconductor.

A monolithic motor driver curcuit, such as type HA 13426 manufactured by Hitachi, generates three phase driving signals for the windings of the motor 16 in response to phase commutation signals generated within the motor from Hall detectors, and further in response to a spindle frequency reference supplied by the timing controller 130.

A power interface and regulator circuit 138 receives +5 volts DC at approximately 1.80 Amperes, and +12 volts DC at approximately 2.25 Amperes from a host power supply and distributes this power throughout the subsystem 10.

Control Lines and Buses

An eight bit parallel, time shared address/data bus 150 interconnects the microprocessor 102, the read only memory 104, the data controller 106, the interface controller 110, the digital to analog converter 120, the digital to analog converter 125, and the analog to digital converter 128, as shown in FIG. 6.

An actuator control value line 152 interconnects the DAC 120 and the actuator driver 122, and a two-conductor line 154 (part of the flat ribbon 40) carries operating current to the coil 32.

Conductors 156 carry the three phase driving currents generated by the motor driver 136 to the three delta-connected windings of the spindle motor 16. The phase commutation signals developed within the motor 16 are returned to the motor driver over wires 158. The microprocessor 102 generates a "spin" command and sends it to the motor driver 136 on a line 160, and the driver 136 returns an "up to speed" status signal to the microprocessor 102 via a line 162. The +5 and +12 voltages enter the power interface 138 via lines 164 and 166, and the interface supplies a "power on reset" interrupt signal to the microprocessor 102 via a line 168.

An "enable" signal generated by the data sequencer and memory controller 106 is sent to the head interface circuit 36 via a line 170 to prevent writing to the disk surface whenever disabling conditions, such as power outages, are present. A head select command is generated by the microprocessor 102 and sent to the circuit 36 on digital control lines 172 in order to select one of the six or four heads 24 present in the system 10. A write unsafe status signal generated by the interface circuit 36 is returned to the microprocessor 102 through the controller 106 over a line 174.

A ROM select signal is sent by the microprocessor 102 to the ROM 104 over a controlline 176, and address values are then sent to the ROM 104 over a dedicated address bus 178 so that the instructions recorded in the ROM 104 may be retrieved and executed by the microprocessor 102 in proper sequence.

A "conversion ready" status signal is supplied by the analog to digital converter 128 to the microprocessor 102 over a line 180 in order to signal that the value held by the converter 128 is valid and should be picked up by the microprocessor. An interrupt signal for warning the microprocessor 102 of the imminent arrival of the the beginning of each servo sector is delivered to the microprocessor via a line 182. This interrupt permits the microprocessor to complete its present instruction cycle and push all present program values onto its internal stack so that it may then execute a position interrupt service routine POS_ISR for processing servo sector data to carry out positioning operations incident to both track seeking and track following.

The data controller 106 sends 1,7 encoded user data to be written to a sector location to the interface circuit 36 over a serial write data line 184, and it selects read/write operations of the interface circuit 36 by the signal present on another line 186.

Raw data read from a selected surface and track (whether a user data block or absolute position servo information) passes through the interface circuit 36 and enters the single read channel 124 over a line 188. Filtered data from the read channel 124 is distributed to the burst amplitude measuring circuit 126 as well as to the pulse detector circuit 132 over a line 190. The mean amplitude value for each servo burst is sent from the measuring circuit 126 to the ADC 128 over a line 192; and, operation of the measuring circuit 126 is timed by a signal supplied by the timing controller 130 over a line 194. The timing controller also times the operation of the ADC 128 by a signal sent over a line 196.

The raw digital data put out by the pulse detector 132 enters the timing controller 130 over a line 198. The encoded data put out from the timing controller 130 is buffered and then enters the read clock sync circuit 134 over a path 200. The sync circuit 134 is timed by a signal from the timing controller 130 also supplied over the path 200. Raw (1,7 format encoded) data in serial format passes from the sync circuit 134 to the data controller 106 over a line 202, and a data clock signal (15 MHz) synchronized with raw data reaches the controller 106 over a line 204. As already mentioned, the data controller 106 has the ability to address directly the read only memory 104 over a dedicated address bus 206 in order to assist the microprocessor 102 in carrying out its supervision and control activities. It also addresses the buffer RAM 108 over a dedicated address bus 208 for the same reason. A data bus 210 interconnects the RAM 108, data controller 106 and interface controller 110.

Sector Layout

Figure 7A:
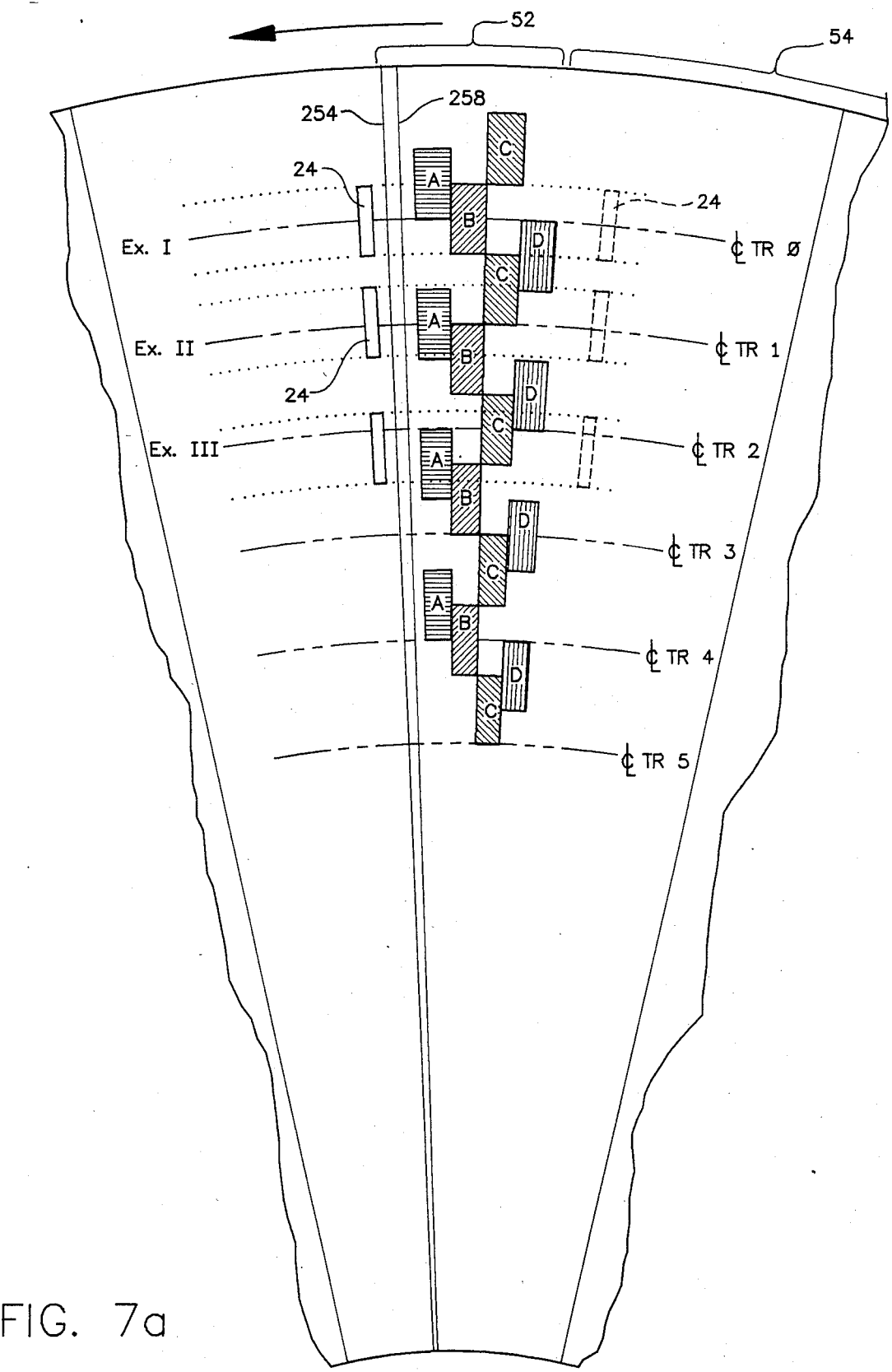
FIG. 7A is a diagrammatic plan view of a servo sector of the disk file subsystem of FIG. 1 illustrating layout of a preferred servo burst arrangement for each servo sector as well as relative head position during track following operations of the FIG. 1 disk file subsystem.
Figure 7B:
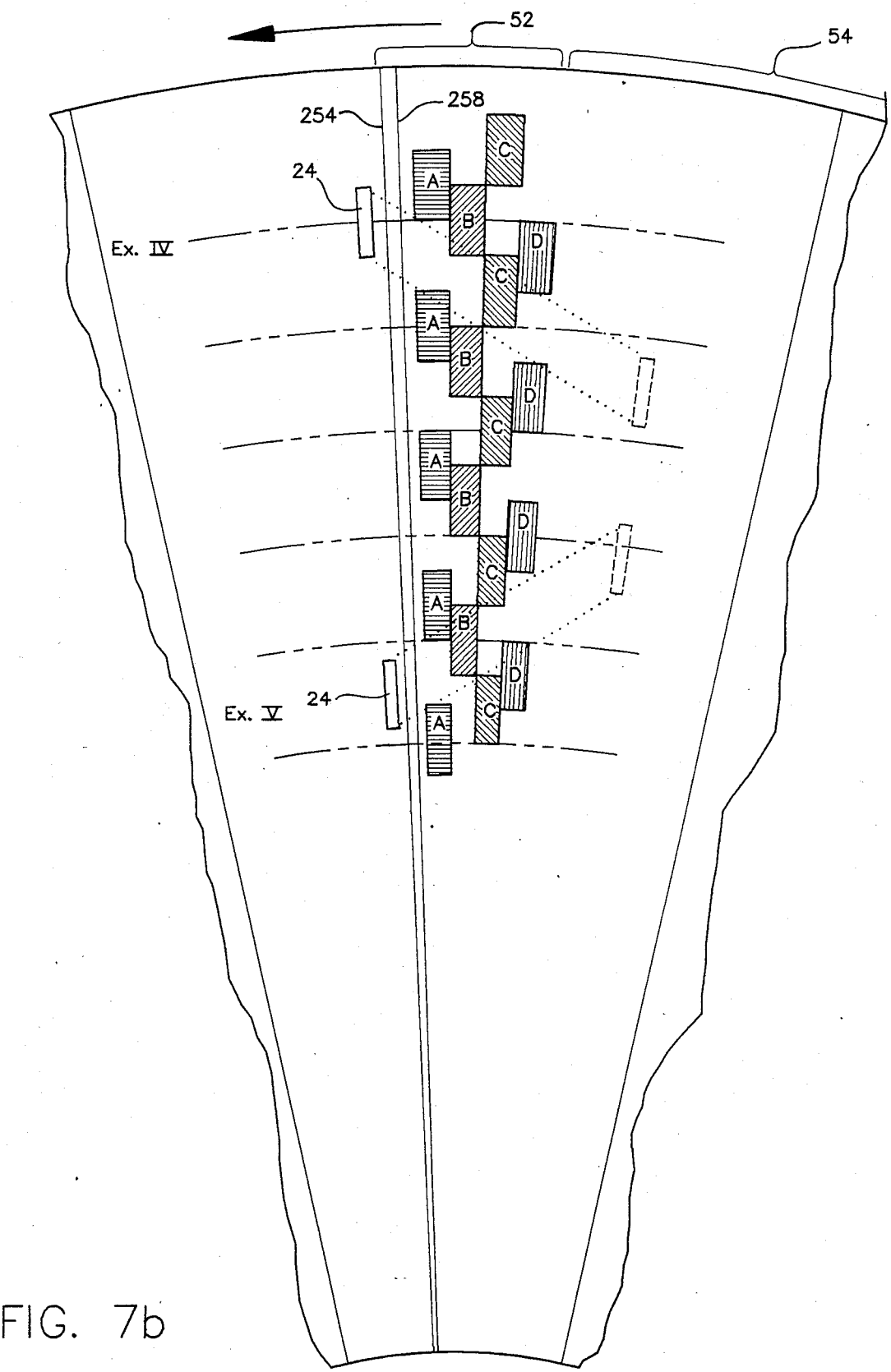
FIG. 7B is a diagrammatic plan view of the same servo sector depicted in FIG. 3A further illustrating relative head position during track seeking operations of the FIG. 1 disk file subsystem.

FIGS. 7A and 7B illustrate the layout of a preferred qualification area and servo burst pattern arrangement for each servo sector 52. The same pattern is replicated on each data surface of the system 10. As can be seen by the illustrated pattern, there are four radially offset, time sequential bursts: burst A, burst B, burst C, and burst D. All like bursts are separated from each other by four thirds of one data track pitch. Each burst type is offset radially from the next adjacent of other burst types by one third or two thirds the pitch of each data track. Since the actual width of a data transducer is approximately two thirds of a track pitch, approximately one third track pitch nominally separates each data track from adjacent tracks. The preferred servo burst pattern illustrated in FIGS. 7A and 7B repeats itself every fourth track.

For each data track 50, two of the four bursts are equally offset from track centerline by one third track pitch. For that track one of the other bursts is entirely within the head transducer width at that particular track, and the other is entirely outside. This arrangement provides a quadrature arrangement, so that the relative amplitudes of bursts read by the transducer 24 at a known position will provide valid direction feedback information during seeking operations.

Track following operations of the system 10 are under the control of the microprocessor 102. The microprocessor 102 forms a key element of a time sampled, closed loop servo which further includes the selected head 24, the interface circuit 36, the read channel 124, the burst amplitude measuring circuit 126, the ADC 128, the DAC 120, the actuator driver 122 and the rotary actuator 30. These operations are best understood by study of FIG. 7A in conjunction with FIGS. 8A, 8B, 8C, 8D and 8E, shown together on the same sheet of drawings.

The timing controller 130 includes a timer which is locked to actual sector frequency, providing that the sector field is first qualified by successful detection of information in a qualification area 250 at the very beginning of each sector 52. This qualification area 250, illustrated in FIG. 11, includes a first direct current erase gap 252 of approximately 2.6 microseconds duration, a first flux transition dibit pulse pair separated by 0.4 microseconds and forming a sector pulse pair 254, a second erase gap 256 of 3.8 microseconds duration, a second flux transition dibit pair separated by 0.4 microseconds duration for forming an echo pulse pair 258 and a third erase gap of 8.667 microseconds duration before the first servo burst time interval is reached. When this particular sequence is sensed by the timing controller (and it is unique in that it does not correspond to any valid user data that may be written), the phase locked loop of the timing controller 130 is updated. This update occurs approximately 8.8 microseconds after detection of a valid echo pulse (which is possible only if a valid sector pulse pair separated by two properly timed erase gaps 252 and 256 are also detected). This process enables a highly reliable sector marker signal to be generated, and from this signal, all of the necessary other timing pulses may be derived.

Servo burst timing signals (FIG. 12) are generated by the timing controller 130, and these signals on the line 194 enable the burst amplitude measuring circuit 126 to sample a preamble portion of each servo burst (which is recorded at constant frequency) and to develop a value related to the peak amplitude thereof read by the head 24. Then this value is quickly converted to a digital word by the analog to digital converter 128 and sent to the microprocessor 102 where it is stored in temporary local storage, in accordance with the state of signals on control lines 196 and 180.

After all four burst amplitude values are acquired, the microprocessor 102 analyzes the four values and derives a correction value which is sent through the DAC 120 and amplifier 122 to the actuator 30 to adjust the transducer to data track centerline.

The timing pulses required to acquire and process information in each servo sector are shown in FIG. 12. These pulses are generated within and by the timing controller 130. The timing values given on FIG. 12 are to be understood in relation to a basic system clocking frequency of 15 MHz (66.7 nanoseconds). The timing control signals are as follows:

RAW DATA: corresponds to the instantaneous pulses derived via the head transducer 24, interface 36, and read channel 124 from the qualification area 250 of a servo sector 52. Raw data is asynchronous with respect to a system clock frequency.

SYNCHRONIZED RAW DATA (SRD): corresponds to a more generalized raw data signal which is generated internally within the timing controller 130 to be synchronized with the system internal clock.

The timing controller 130 includes two 13 bit counters, an up counter and a down counter. Each counter is designed to count out a 512 microsecond interval corresponding to the duration of each servo/data sector. The counters operate on the 15 MHz system clock as the base counting rate. During system reset, such as at power on, the counters are set by a TRIGGER PULSE (TRIG) after the first of two consecutive sectors 52 has been read.

The TRIG pulse, in this instance, and usually, is generated by an eight bit counter within the timing controller which begins its count with the arrival of a valid echo pulse. Upon arrival of the TRIG pulse, the up counter begins counting up, and it continues its count until the next TRIG pulse is received as a result of the second of the two consecutive sectors 52. At this point, the count carried in the up counter is loaded into the down counter as a preset count. Then, the up counter is reset to zero and begins counting upwardly. At the same time, the down counter begins to count down toward zero. As designed, the down counter will reach a zero count after 512 microseconds, the nominal duration of each sector, including servo and data portions thereof.

When a qualification area 250 has been tested (irrespective of its validity), the TRIG pulse is generated and it causes the up counter's count to be preset into the down counter. Since instantaneous speed variations in e.g. spindle rotation or unequal sector lengths may cause a TRIG pulse to occur sooner or later than the nominal 512 microsecond period for each servo and data sector pair, the actual count reached by the up counter may be less or more than a count corresponding precisely to 512 microseconds.

The resultant count measures the time length of the preceeding sector and is used to predict the beginning of the next sector qualification area 250. When a particular validation area 250 is not validated, the eight bit counter inside the timing controller 130 does not initiate the clear and load operations of the up and down counters, and a "virtual" TRIG pulse is generated when the down counter reaches a zero count. The virtual TRIG pulse operates in the same way as the TRIG pulse generated by the eight bit counter: the value in the up counter is loaded into the down counter and then reset to begin counting up from a zero count. Thus, the timing controller achieves a flywheel action in the event that one or more qualification areas 250 of consecutively occurring servo sectors 52 fail to be validated.

In this manner, timing is seldom, if ever lost, and the system recovers absolute timing when a qualification area is validated. In this manner, the mechanism for marking in time the precise location of the beginning of each sector is made precisely correct when each qualification area is validated and is averaged whenever a qualification area fails to be qualified. In practice, instantaneous speed variations are very small, and the resultant variance in the count transferred from the up counter to the down counter at each trigger pulse is of a small value.

QUALIFICATION AREA WINDOW (QUAL WINDOW): the down counter inside the timing controller 130 provides a sequence of times during which various tests are performed and events are detected which cumulatively determine whether a qualification area 250 is valid. First, the first erase gap 252 is tested by initiating the eight bit counter; if a count is reached without detection of a data pulse, a flag is set. The sector dibit 254 is sensed, and a flag is set if present. The eight bit counter is then cleared and started to count the second erase gap 256. The timing controller 130 then looks for the echo dibit 258. If the second erase gap and echo dibit 258 are found to be present, then the third erase gap 260 is tested by restarting the eight bit counter. If all of these tests are passed, a valid qualification area 250 is determined to be present, and approximately 8.8 microseconds later, the TRIG pulse is generated.

WEDGE is asserted, READ GATE is deasserted and QUAL ERROR (if asserted) is deasserted at the same time when the down counter reaches a certain count. WEDGE is an interrupt to the microprocessor 102 and functions to initiate the position interrupt service routine POS_ISR.

If the sector and echo dibits 254, 258 and/or the erase gaps 252, 256 and 260 are not validated, then the QUAL ERROR becomes positive as shown in FIG. 12, indicating that the qualification area has not been validated at this particular sector, and that a virtual TRIG pulse will be relied upon (down counter reaching a zero count).

HOLD: this signal, along with the RESET AMPLITUDE MEASURING CIRCUIT (RSTPKD) signal, is generated to operate the burst amplitude measuring circuit 126. When RSTPKD is non-asserted (false), the measuring circuit is able to begin measuring the amplitude of the constant frequency (3.75 MHz) burst preamble of each servo sector burst. Actual measurement begins when the HOLD signal becomes false, and ends when HOLD returns to true. The value measured when HOLD returns to true is the measured amplitude for the particular burst. The CONVERT (CONVRT) signal is generated by the timing controller 130 and sent over the line 196 to cause the ADC 128 to convert the measured and held amplitude for a particular burst into a digital value. Once the conversion process is completed, the ADC signals the microprocessor 102 of that fact over the line 180, and the microprocessor thereupon transfers the burst measurement digital value into storage for further processing. The RSTPKD, HOLD and CONVRT timing signals are repeated for each of the four time staggered servo bursts so that relative amplitude values are acquired for each of them. After these amplitude values are acquired, converted to digital values and stored in memory by the microprocessor 102, it is able to carry out centerline correction calculations or seek profile correction calculations during operations of the system.

PREAMBLE VALID: this signal is generated simultaneously with deassertion of PEAK DETECT. This signal is reset for each of the four burst timing intervals. It indicates to the data controller 106 that the selected data transducer head 24 is located over the constant frequency preamble portion of one of the servo bursts and that the data separator should phase lock to this field.

READ GATE: this signal is asserted by the TRIG pulse and is constantly tested when WEDGE is true.

PHASE COMPARATOR: this signal is put out from the read clock synchronizer 134 over a line 201; it indicates that the read clock synchronizer 134 has been unable to lock onto an incoming constant frequency burst preamble. The timing conroller 130 tests this signal during the time that READ GATE is asserted while the head 24 is over the servo sector area 52 in order to see if it remains asserted for five consecutive clock systems. If so, then READ GATE is deasserted until arrival of the next servo burst interval whereupon it is asserted and again tested to see if phase lock is achieved. In this manner, faulty absolute position data resulting from phase lock failure is overlooked and not delivered to the data controller 106.

When the user data field is reached, the READ GATE is deasserted if not already deasserted from the D burst. The WEDGE signal is deasserted. A short delay follows to provide for a write splice gap between the end of the D sector burst and the beginning of the sync field of the data portion. Then, READ GATE and PREAMBLE VALID are reasserted. After a short period, PREAMBLE VALID is deasserted. The timing signals put out by the timing controller 130 remain static until the onset of the next qualification area, whereupon the foregoing signalling sequence is repeated.

FIG. 7A and FIGS. 8B, 8C and 8D illustrate three separate track following conditions, labelled Example I, Example II, and Example III. In Example I (FIG. 8B) the head 24 is in precise alignment with the centerline of track zero. It encounters the sector dibit 254 and the echo dibit 256 and these robust pulse dibits are recovered. Then, the head 24 encounters bursts A, B, C and D. The A burst and the D burst have generally equal amplitudes as shown in FIG. 8B. At the same time the B burst amplitude is at maximum value and the C burst amplitude is at minimum value. The data track signal 262 begins after the D burst has passed by.

In Example II, the head 24 is slightly outside the centerline of track one. In this instance the B burst (the radially inside offset burst) is slightly lower in amplitude than is the C burst (the radially outside offset burst). The A burst amplitude is not quite maximum, and the D burst is slightly above minimum value. The microprocessor 102, knowing that the head 24 is intending to follow track one thereby knows that it must compare the amplitudes of the B burst and the C burst in the proper radial offset sense. It then derives a correction value which is sent through the DAC 120 and the amplifier 122 in order to move the head back to track centerline.

In Example III the head 24 is substantially off of track centerline for track two. In this case, ordinarily the A and D burst amplitudes would be compared in order to monitor centerline alignment and derive a correction value, if required. However, the D burst amplitude may be approaching a minimum, as the A value approaches maximum. In this instance, the microprocessor 102 may consider the head to be following a "centerline" which is one third of a track inside of true centerline for track two and then command a one third track seek by adding an offset value into the position correction calculation. Thus, the amplitudes of the B and C bursts would be read and combined with an offset value in order to return the head to the centerline of track two.

The advantage of the quad burst servo pattern depicted in FIGS. 7A and 7B over other more symmetrical patterns is most apparent when considered in light of the track seeking function of the subsystem 10. During track seeking, a slightly different servo loop obtains. The servo loop during track seek operations of the system includes, in addition to the elements employed during track following, the pulse detector 132, the read clock synch circuit 134 the data controller 106 and the buffer RAM 108. The reason for inclusion of these additional elements is that each servo burst contains track identification information as well as the constant frequency preamble. The details of this information are discussed hereinafter in connection with FIG. 11. What is important to note at this point is that the track identification information recorded in each servo burst is actually recovered by the data controller 106 and temporarily stored in the buffer 108.

As is explained hereinafter in greater detail in the section entitled "Control Program for Microprocessor 102", during the seek operation, the microprocessor 102 is interrupted at the arrival of each qualification area and thereupon sequentially acquires and stores away the burst amplitudes for the four sector bursts A, B, C and D. Each of these amplitudes may vary considerably, as shown by the waveforms of FIGS. 8E and 8F. Since the track identification information from sector bursts of low amplitude is not likely to be reliable, the microprocessor 102 only calls up the identification information from the burst having the greatest amplitude (or next greatest amplitude in the event of an error in reading the largest amplitude burst). This absolute position information provides the microprocessor 102 with instantaneous absolute positional information concerning the whereabouts of the head 24 during the seek. Thus, by the expedient of a look up velocity profile selected and/or calculated for the particular seek distance and relative track positions, the microprocessor 102 maintains precise control over the head assembly position throughout the seek.

Several additional examples may shed further light on the seek operation. Example IV (FIG. 8E) shows a seek segment when the head 24 is moving from a radially outer track location to a radially inner track location. In Example IV shown in FIG. 7B FIG. 8E, while the sector dibit 254 and the echo dibit 258 remain quite robust, only the C pulse has a significant amplitude throughout its duration, because of the locus of flight of the head 24 shown by the dotted lines. Thus, the track identification information contained in the C burst will be read by the microprocessor 102 in order to verify instantaneous position of the head as it passed over this particular sector (it being remembered that there is a latency between the time the head 24 passes over a burst of the sector and the time that the microprocessor 102 is available to read and process the track identifiction information obtained from that burst).

Example V (FIG. 7B and FIG. 8F) illustrates a seek in the opposite direction, from inward to outward. In this example, the B burst of the particular sector yields the largest amplitude, and so the microprocessor 102 will read the track identification information from this burst.

By inspection of FIG. 7B it is apparent that there is no locus of flight for the head 24 which will not pass over a substantial portion of at least one burst for each sector. In order to prevent ambiguity, the maximum positional displacement of the head assembly is limited to one track width per servo sector time. This prevents the head from reading radially in-line bursts of the same type during a single sector with resultant recovery of corrupted track identification information. With the subsystem 10, the maximum seek velocity is approximately 30 inches per second, which yields an average track access time of less than 30 milliseconds.

Qualification Area 250

One feature of the present invention is the provision of a prerecorded synchronization pattern on each disk surface for delineating the beginning of each servo sector 52. As already explained, the qualification area includes the sector dibit pulses 254 and the echo dibit pulses 258 separated by the three direct current erase gaps 252, 256, and 260. One reason that the sector and echo pulse pairs are reliably detectable, even during track sensing operations, stems from the fact that these pairs are recorded for every other one-third track pitch (centerline to centerline) by the servo burst writing process during fabrication of the subsystem 10. This arrangement is illustrated in FIG. 9.

When the servo pattern is initially written, for example, the C burst is first recorded and with it a sector dibit pulse pair and an echo dibit pulse pair. Then the head 24 is stepped one third track inwardly and an A burst is recorded. The head is again stepped one third track inwardly and a B burst is written, together with sector and echo dibit pulse pairs. Again, the head is stepped one third track inwardly and the D burst is written. Alternatively, and with equal effectiveness the sector dibit pulse pair and echo dibit pulse pair could be written with the A and D bursts. Thus, it will be appreciated that the sector and echo dibit pulse pairs are written every two thirds track pitch.

Figure 9:
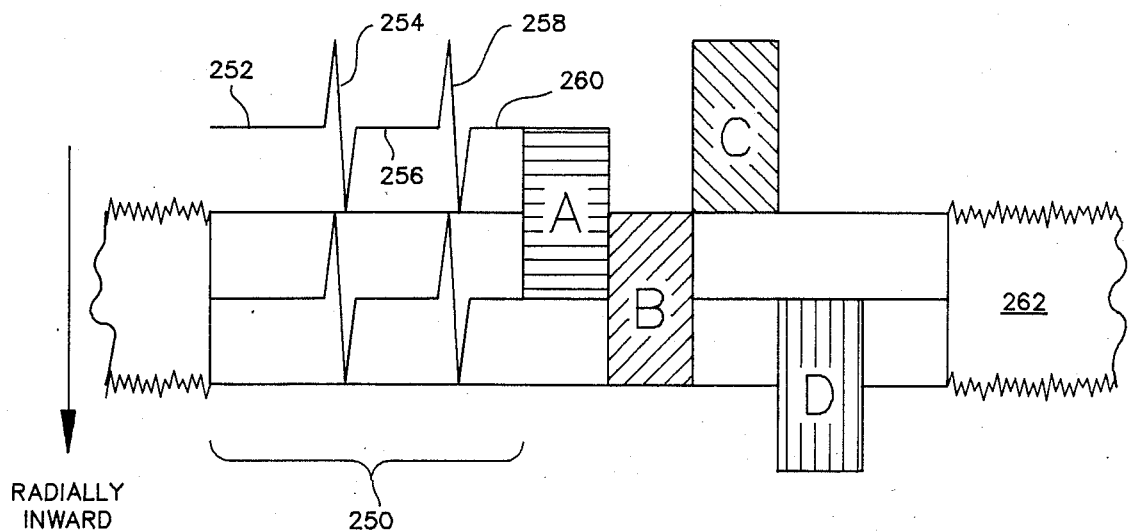
FIG. 9 is an enlarged diagram of a servo sector pulse arrangement for a single data track of the FIG. 1 disk file subsystem, showing the overlapped recording of sector and echo pulses in the qualification area immediately preceding the sector pulses.

As is apparent from FIG. 9, the time between the sector and echo pulse pairs and each burst type (whether A, B, C or D) varies, but these time differences are precisely calculated by the servo writer controlling the HDA 12 during the servo writing process, so that each sector pulse pair 254 and each echo pulse pair 258 is in substantial alignment with every other sector and echo pulse pair. Absolute radial phase alignment of the sector and echo pulses is not essential as the head 24 averages any tolerance variations, and the up and down counters of the timing controller 130 eliminate any effects of slight variances, as already explained.

A very reliable sector marker is achieved with the sector and echo pulse pairs in conjunction with the timing controller 130. The timing achieved is more precise than that achievable with optical encoder technology, because the substantial electro-optical rise times and delays are avoided.

One Third Radial Track Pitch For Servo Bursts

One advantage of one third track pitch for servo bursts, as opposed to half track pitch employed in prior art devices, is illustrated by FIG. 10. Therein, the plot of burst amplitude against radial movement of the head 24 from one track centerline to another illustrates that average amplitude of the two bursts being read for track centering is much higher with one third track spacing of the bursts than it is for one half track spacing of the bursts. With burst spacing of one third track pitch, or one fourth track pitch, etc., (a whole fraction), the pattern becomes repeating, which simplifies the processing task in the microprocessor insofar as the selection of particular burst pairs to be compared for track centering calculations. However, with the available power of the microprocessor, there is no requirement that the pattern be either symmetrical or repeating: the particular pattern may be arbitrary and be the subject of a table lookup by the microprocessor 102, depending upon the particular track location in question.

Servo Burst 270

Figure 11:
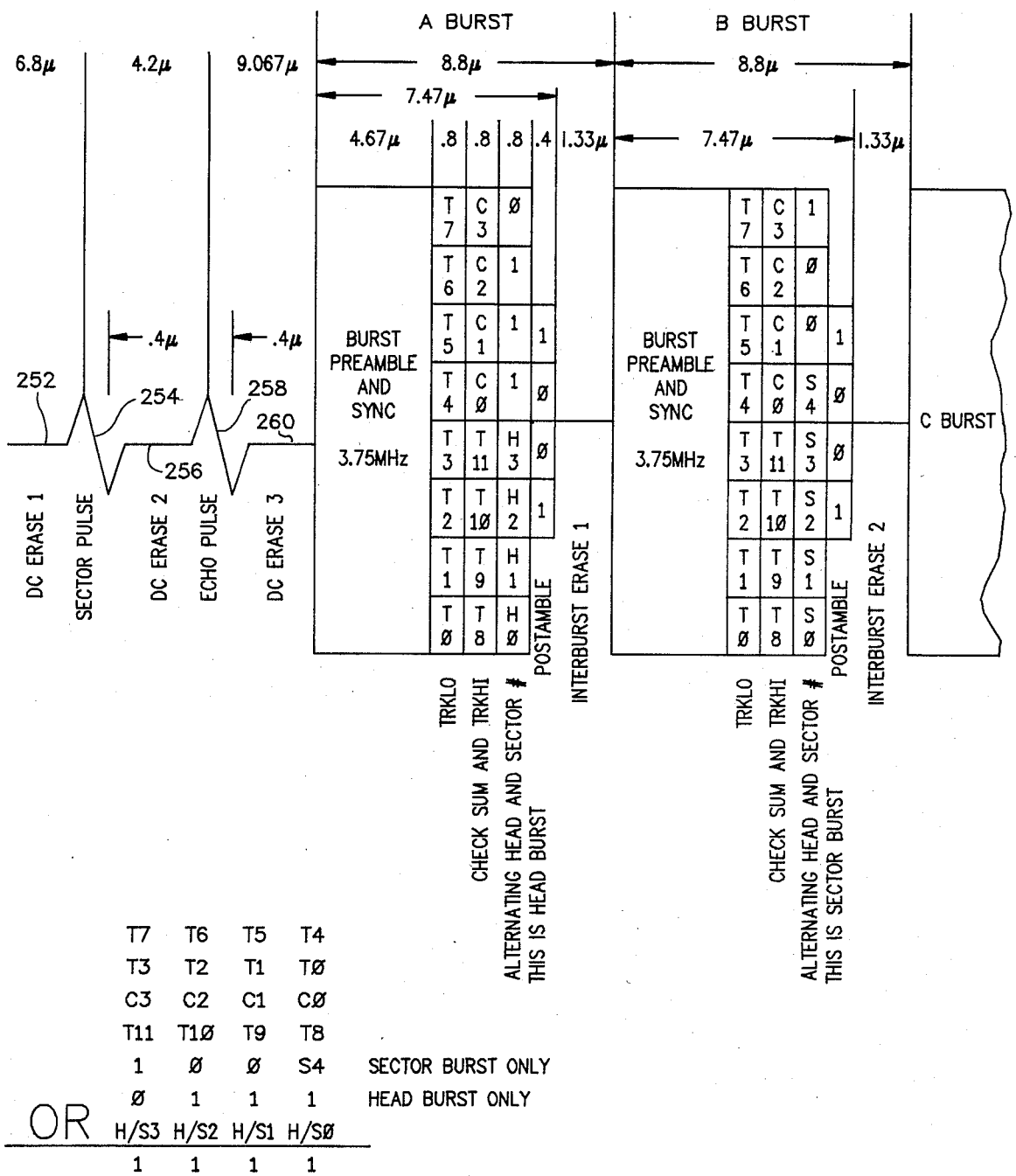
FIG. 11 is a diagram of placement of absolute position and other useful information within each servo burst of the FIG. 1 subsystem.

As shown in FIG. 11, each servo burst 270, whether an A burst, a B burst, a C burst or a D burst, contains a burst preamble 272 comprising approximately 4.67 microseconds of 3.75 MHz constant frequency preamble, followed by three data bytes, and then followed by a postamble. A short duration (1.33 microsecond) interburst erase gap separates each burst.

The burst amplitude measuring circuit 126 operates to measure a gated integral number of flux transitions of the constant frequency preamble, since any variation in frequency incident to recording of useful information, would affect average amplitude and yield an unreliable amplitude value.

The first byte contains eight low order bits of the twelve bit track number. The second byte contains the four remaining high order bits of the track number as well as four check sum bits. The third byte contains (in alternating bursts) the head or sector number. As shown in FIG. 11, the A burst contains a four bit head number (allowing up to eight heads to be identified), and the B burst contains a five bit sector number (for the 32 sectors). The XOR table set forth in FIG. 11 sets forth the check sum calculations, and the Sector Burst table also set forth in FIG. 11 shows the correlation between bursts and sectors insofar as head and sector information is concerned.

Amplitude Measuring Circuit 126

Figure 13:
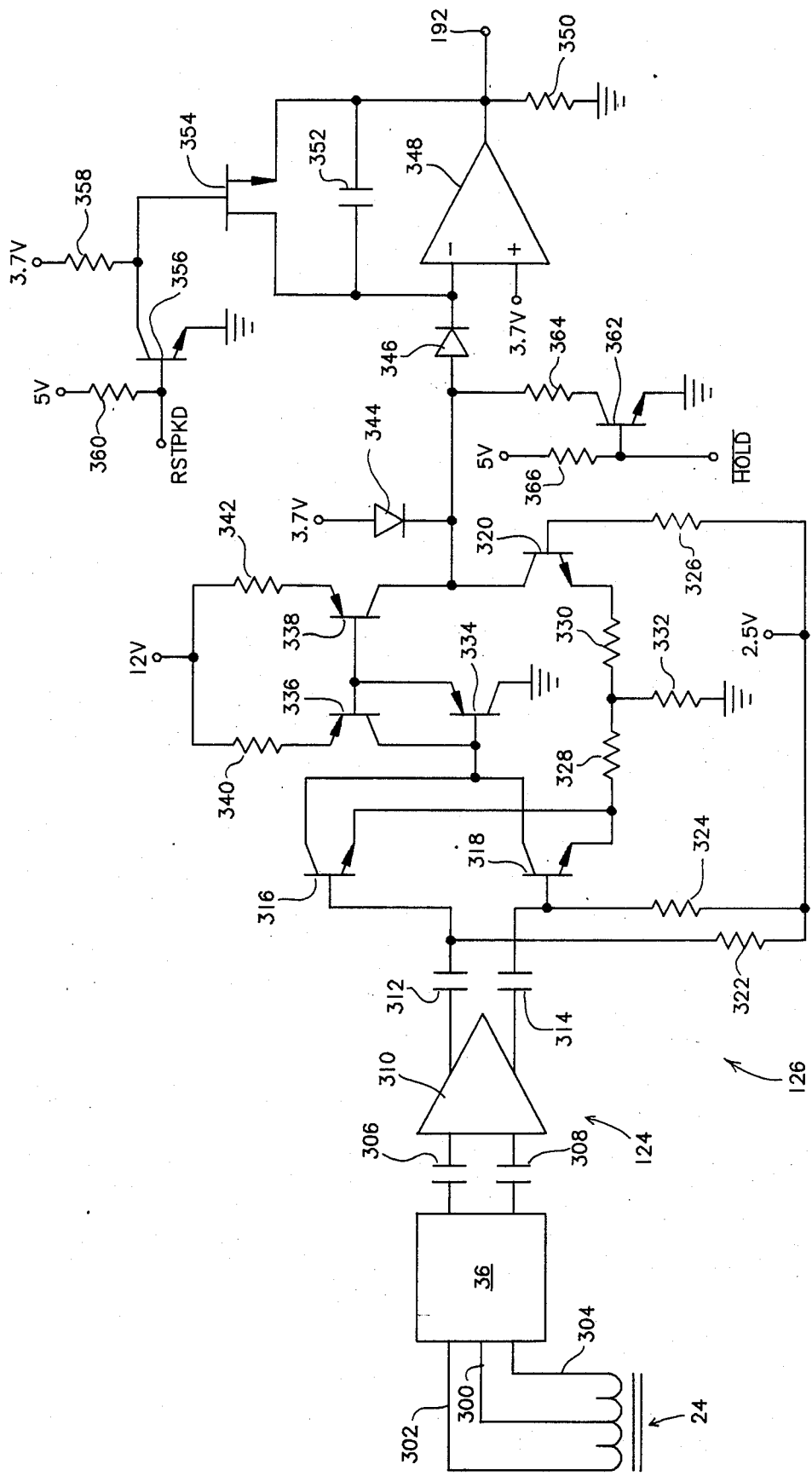
FIG. 13 is an electric circuit schematic diagram of an amplitude measuring circuit employed in FIG. 1 disk file subsystem.

Circuitry implementing the function of the amplitude measuring circuit 126 is set forth in FIG. 13. This circuit 126 derives the integral of a gated portion of the burst preamble in a very rapid manner which achieves substantially greater noise immunity, signal to noise ratio, accuracy and repeatability than is achievable with conventional peak detectors heretofor used for burst amplitude measurement. Therein, one of the electromagnetic data transducers 24 is shown as a center-tapped coil having a centertap lead 300 and two phase-opposed leads. The interface circuit 36 selects the particular data transducer 24 from among the array thereof by selectively grounding the centertap 300. The magnetic flux transitions then pass through direct current blocking capacitors 306 and 308 and are amplified and shaped in an amplifier portion 310 of the read channel 124. Amplified, phase opposed outputs from the amplifier 310 pass through two direct current blocking capacitors 312 and 314.

Two NPN transistors 316 and 318 have their emitters and collectors connected in common; and, they alternatively amplify half envelopes of the phase opposed flux transitions, thereby acting together as a full wave rectifier to eliminate the transition direction or sense. An NPN transistor 320 is connected in a complementary fashion with respect to the transistor 318 in order to form a differential amplifier. Three equal value resistors 322, 324 and 326 provide bias current to the transistors 316, 318 and 320, respectively. The emitters of the transistors 316 and 318 on the one hand, and 320 on the other hand, are connected together through a Tee resistance bridge comprising equal value resistors 328 and 330 and a common resistor 322 to ground.

The collectors of the transistors 318 and 320 are connected together through an active load acting as a current mirror and including PNP transistors 334, 336 and 338 connected as shown in FIG. 13. Two emitter load resistors 340 and 342 are connected between a +12 volt supply and the emitters of the transistors 336 and 338, respectively. The amplifier stage formed by the transistors 318, 320, 334, 336 and 338 acts as a transconductance amplifier.

An output of the differential amplifier which is a function of the input thereof (the output current is a mirror of the input current) is taken from the collectors of the transistors 320 and 338. This output is biased at +3.7 volts by diodes 344 and 346. It then enters an inverting input of an operational amplifier 348 configured to act as an integrator. A +3.7 volt reference is applied to a non-inverting input of the amplifier 348. A load resistor 350 at the output 192 of the amplifier 348 provides a proper impedance termination for the circuit 126. The output 192 connects to an input of the analog to digital converter 128.

An integrating capacitor 352 is connected in a feedback arrangement from the output to the inverting input of the operational amplifier 348. This capacitor accumulates a value comprising the integral of the amplified and shaped full wave rectified flux transitions which are measured by the circuit 126.

A fast acting field effect transistor 354 is shunted across the integrating capacitor 352. When the transistor 354 is not conducting, there is a very high impedance between the source and drain thereof. However, when the transistor 354 is caused to conduct, a very low impedance is present, and the charge accumulated in the integrating capacitor 352 is immediately discharged, thereby resetting the capacitor 352 for the next burst amplitude measurement.

The field effect transistor 354 is operated by an NPN transistor 356 having its emitter grounded and its collector connected to the gate of the field effect transistor 354 and to +3.7 volts through a pull up resistor 358. The base of the transistor 356 is connected to the reset amplitude measuring circuit timing signal (RSTPKD) generated by the timing controller 130. A pull up resistor 360 to a +5 volt supply normally biases the transistor 356 into conduction. When RSTPKD (FIG. 8) is not asserted or not true, the transistor 356 does not conduct, and +3.7 volts is applied to operate the field effect transistor 354 in order to discharge and prevent any further charge accumulation in the integrating capacitor 352. When RSTPKD is asserted or true, the transistor 356 conducts, cutting off the field effect transistor 354 and thereby permitting charge to accumulate in the capacitor 352.

An NPN transistor 362 has an emitter connected directly to ground and a collector connected to the signal node between the diodes 344 and 346 through a current limiting resistor 364. A base thereof is connected to the HOLD timing signal generated by the timing controller 130 and also to a pull up resistor 366 connected to a +5 volt supply. When HOLD is asserted or true, the transistor 362 conducts and opens the inverting input of the integrating amplifier by reverse biasing the diode 346. When HOLD is not asserted or false, the transistor 362 is open and the full wave rectified, shaped and amplified burst preamble for a burst passes through the diode 346 and reaches the integrating amplifier wherein the integral thereof is taken and stored in the capacitor 352.

In practice the HOLD signal is selected so that there will be an even integer number of full wave rectified half cycles of burst preamble for each burst which will actually enter the amplifier 348 and be integrated. The even number provides for self cancellation of any signal anomalies related to any lack of symmetry in the data transducer 24, interface 36, read channel amplifier 310 or full wave rectifier 316–318. In this regard, the transistors 316, 318 and 320 are preferably formed on a single substrate so that any differences in electrical characteristics are thereby minimized.

Defect Management

In magnetic disk data storage devices it is not practicable to manufacture or use data storage disks over any substantial time period which are free of repeatable media defects. Defects may be of a variety of types and result from a variety of causes.

In the manufacture of a data storage disk, usually carried out in a "clean" environment, it is not uncommon for a foreign particle to become adhered in the magnetic media coating on the disk. If the particle is non-magnetic, it is not possible to store a flux reversal at its location. In addition, the presence of the particle may cause unwanted magnetic flux distortions in the adjacent area. If the particle is permanently magnetized, it will create an unwanted flux transition and lead to a data error.

The defect may not be a foreign particle but rather a pinhole or void which does not contain magnetic media. Finally, the defect may arise after manufacture in the event that a foreign particle becomes dislodged inside the head and disk assembly and is crashed into the disk surface by the low flying data transducer. A head contacting the disk caused by sharp impulse jarring of the disk file subsystem may also create an unevenness or asperity on the disk data surface resulting in a defect. The term defect as used herein means not only flaws on the data surface which yield hard (repeatable) data errors, but also conditions in which servo sector information may not be properly recovered.

In order to manage defects it is necessary to replace a sector or track containing a defect with a space sector or track. In accordance with an aspect of the present invention, a multi-tiered or layered approach is taken to management of media defects.

A first tier of the defect management method relies upon an in-line defect map which is generated for media defects which are identified and located during the manufacturing process. This in-line defect map, made and used by the microprocessor 102, records the replacement of a defective physical sector with the next in-line physical sector. While the numbers of the physical sectors are not changed in this process, the numbers of the logical block sectors are changed. Correlation between physical sector and logical block sector number is provided by the microprocessor in real time under program control.

Figure 15:
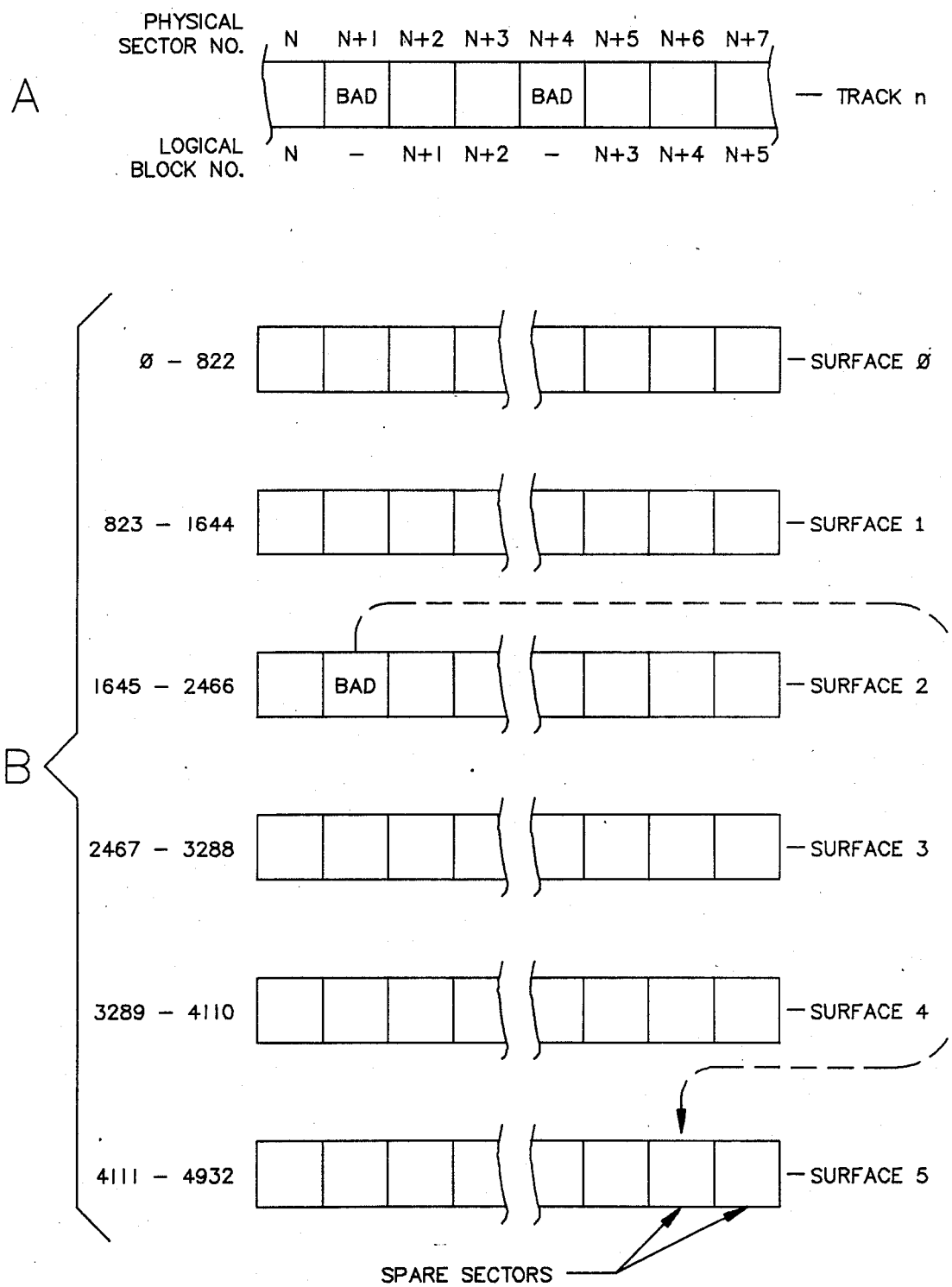
FIG. 15 is a diagram of two tiers of the multi-tiered media defect management method employed in the disk file subsystem depicted in FIG. 1.

The first tier, in-line replacement of following sectors for defective sectors is illustrated in FIG. 15A. The physical sector identification number for each of the thirty two sectors of a track n is given above each sector block. Two of the blocks are labelled "bad", meaning that each contains a media defect. The logical block identification number for the remaining blocks runs in ascending order, but the defective sectors have been mapped out of this order in accordance with the defect map. When a physical sector which is known to be defective is encountered during a read or write process, the microprocessor 102 knows of this defect and causes a one sector delay in the operation of the data controller 106, which thereby skips over and ignores the defective sector.

Some media defects simply do not appear until after the system has left the point of manufacture and has arrived at the user's premises. Rough handling of the drive during shipment may cause particles to become dislodged within the head and disk enclosure, and as already explained, these particles may contribute to asperities on a data surface leading to hard data errors and media defects. Since user data has likely already been recorded on the data surfaces, an in-line substitution is not practical, since it would require relocation of all data following the newly developed defect. The second tier of defect management provides for a mechanism by which a field media defect may be managed by the system 10 automatically and with minimum degradation of system performance and data throughput.

As illustrated in FIG. 15B, the subsystem 10 employing three data storage disks 22 has six major, data storage surfaces: surface 0, surface 1, surface 2, surface 3, surface 4 and surface 5. Since the six required data transducers 24 are ganged together in vertical alignment and are commonly moved radially by the single actuator assembly 30, as diagrammatically depicted in FIG. 3, there are effectively six data tracks for each radial track location position.

Figure 14:
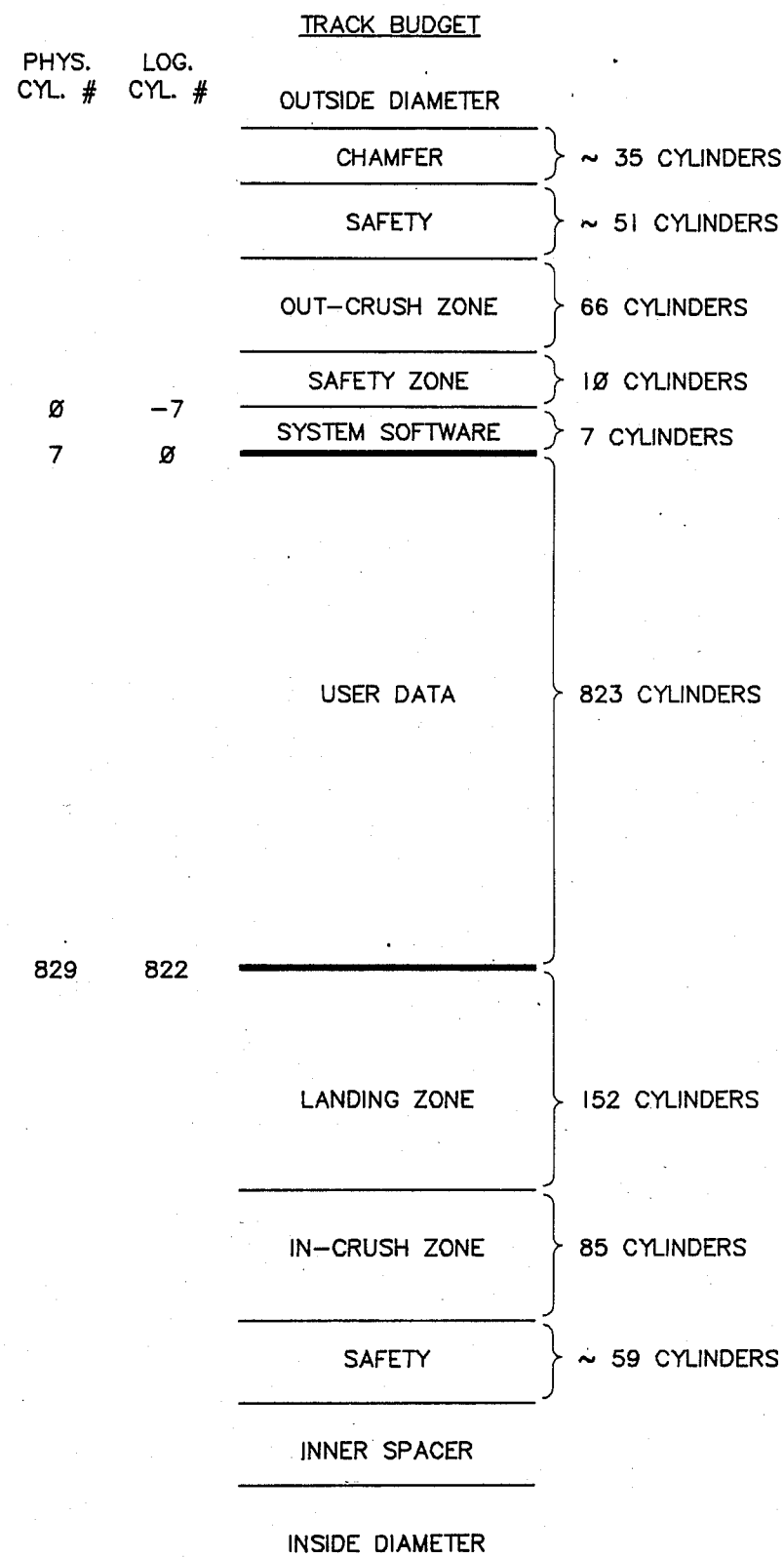
FIG. 14 is a diagram of aerial layout of data storage tracks of a surface of the disk file subsystem depicted in FIG. 1.

As illustrated by FIG. 14, there are 823 cylinders of user data tracks, and seven cylinders of system software (which includes the media defect map recorded on multiple tracks for backup). Each track location is referred to as a "cylinder", and a single cylinder is depicted logically by the FIG. 15B diagram.

For every cylinder location, two sectors are initially reserved as spares for factory defect management at the first tier level. Preferably, these spares are located at the end of a track at the highest physical block address (surface 5). If, during use of the system 10, a hard error is detected in a particular sector, such as the sector labelled "bad" in the track of cylinder n, surface 2 of FIG. 15B, that sector is automatically replaced by the microprocessor 102 with the first available spare sector e.g. a spare sector available at surface 5, cylinder n, and the media defect map is amended accordingly to note this substitution. Subsequently, the first "spare" sector is read from and written to in lieu of the "bad" sector of surface 2 (unless it had already been used for defect management at the first tier factory level or during previous field defect management at the second tier). No movement of the actuator 30 is required in this example, and the microprocessor 102 handles the necessary tasks of head select and latency so that the information of the first "spare" sector is properly handled by the data controller 130. In this defect management situation in which no actuator movement is required, the only loss of performance of the system 10 is the time delay of approximately one disk revolution required to get to the spare sector location and then return to the next sector immediately located after the bad sector which has been replaced by the spare sector.

If both spare sectors of a particular cylinder have been previously used up by operation of the media defect management arrangement of the subsystem 10, then the microprocessor 102 commands a search for an available spare sector in the nearest cylinder location. The microprocessor first looks outwardly by one cylinder, then inwardly by one cylinder, then outwardly by two cylinders, then inwardly by two cylinders, and so forth, until an unused spare sector is located. Once a spare sector is located, the next logical block is assigned to the physical address of the spare sector so located, and the defect map is amended accordingly. The closest available spare sector is always chosen by the microprocessor 102 after its search for spare sectors in order to minimize the amount of actuator movement required to access the spare sector replacing the bad sector.

A third tier of the media defect management method of the system 10 concerns defective servo burst information. If for some reason, a predetermined number of successive qualification areas in a single data track is defective or has become damaged or destroyed after the system has reached the user, a spare track located preferably in the system software area is swapped for the defective track. This swap is handled by the defect management routine and is required because a defective qualification area 250 may lead to improper sampling of the servo burst information and incorrect servo operation. This consequence may cause the head 24 to overwrite adjacent tracks with considerable resultant damage. The microprocessor 102 makes this track substitution automatically under program control, and the use of a substitute track is transparent to the user system, save for the actuator access time required to reach the spare track and then return to the point of departure.

One important advantage of the defect management method employed by the subsystem 10 is that the logical beginning of each data track may be skewed slightly in ascending head number order so that ascendant head selects and head settling at a next selected data surface may be accomplished in a fraction of a disk revolution, irrespective of vertical tilt. This method vastly simplifies other forms of defect management which e.g. generate gaps around the defect, thereby either extending the length of a track, or requiring a gap space for defect management in each track. With the six data surfaces depicted in FIG. 15B, the aerial overhead for defect management (except for spare tracks) amounts to slightly more than one percent (1.04%) of useful data storage area.

Servo Writing Apparatus and Method

Figure 16:
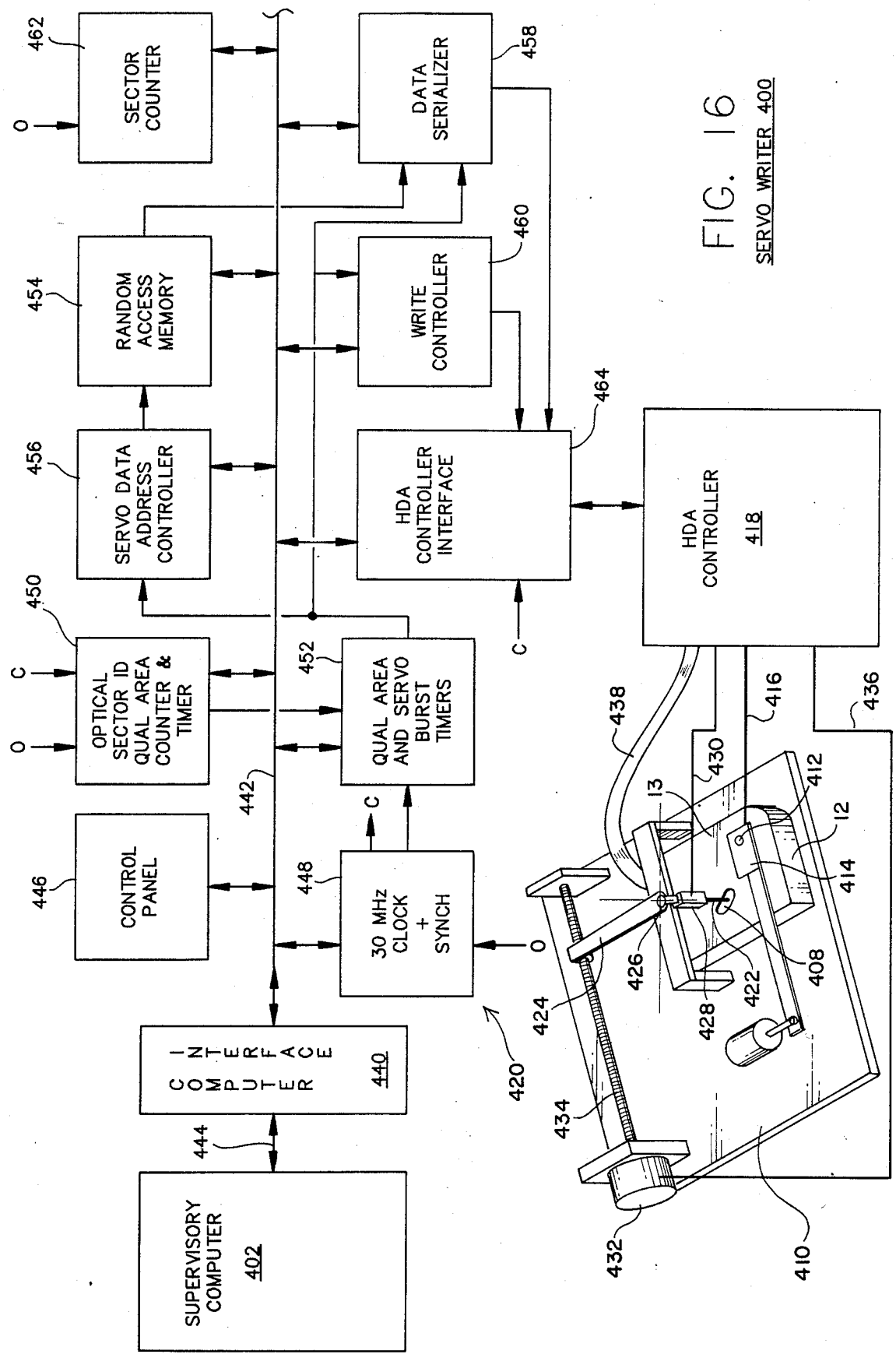
FIG. 16 is a diagrammatic block diagram of a servo writer employed to write the non-phase coherent servo bursts and quasi phase coherent servo and echo pulses on each data surface of the FIG. 1 disk file subsystem.

FIG. 16 illustrates digramatically the servo writing process and apparatus employed during manufacture of each system 10. An automatic servo writer 400 is interfaced to and supervised by a supervisory computer 402. This computer 402 may be a small general purpose computer, such as the IBM Personal Computer TM, in the event that only one servo writer 400 is being supervised. In a production environment where several or many servo writers 400 are in continuous use, the computer 402 requires greater processing capacity and speed, and a minicomputer architecture with input/output processors for each channel to a servo writer 400 works well.

The head and disk assembly 12 on which servos are to be written reaches the servo writing operation in a state in which it has been assembled and closed, but not sealed. The electronics circuitry of FIG. 6 on the circuit board 47, other than the head interface circuit 36, has not been attached to the HDA 12 yet. Since the servo writing operation requires access to the interior of the HDA 12, this operation is carried out in a clean, particle-free environment. The HDA cover 13 includes a hole 406 (FIG. 4) directly over a small portion of the light and dark pattern 22 of the disk clamp 18 (FIG. 1). The HDA cover 13 also has an arcuate slot 408 (FIG. 4) directly over a servo writer hole 404 (FIG. 1) in the arm assembly 28 of the HDA 12. After the servo writing operation for a particular HDA 12 is completed and verified, the hole 406 and the slot 408 are covered with airtight seals to prevent intrusion of unwanted particulate contamination.

The servo writer 400 includes a bed 410 which aligns and holds the HDA 12 in a precise orientation for servo writing. An optical transducer head 412 including a light source and a photodetector is automatically positioned over the hole 406 so that it is approximately five millimeters above the pattern 20. The emitter-detector optical transducer head 412 and its processing circuitry are separately contained on a small printed circuit support card 414.

The head 412 responds to the thirty-two alternating light and dark patterns 20 of the head and disk assembly 12 for which servos are to be written by putting out a trapezoidal waveform over a line 416 which extends to processing circuitry located in an HDA controller 418. In the controller 418, the trapezoidal current is converted to a voltage and then compared against a reference voltage to generate a square wave optical sector clock signal O which is sent over a control bus to servo control electronics 420. The controller 418 also includes circuitry which automatically controls and adjusts the gain of the light emitter in the head 412. The light emitter of the head 412 operations in the visible spectrum at approximately 700 nanometers wavelength. The head 412 also includes a suitable lens assembly for focusing the emitted light onto the hub and the reflections therefrom onto the photodetector. A Hewlett-Packard type HBCS-1100 assembly works well for the head 412.

The servo writer 400 also includes a pin 422 mounted on a rotatable lever 424 having a journal 426 about the same axis of rotation as the rotary actuator 30 (FIG. 1) of the HDA 12. The pin 422 is lowered automatically through the slot 208 and into the hole 404 of the rotary actuator arm 28 by operation of a step motor 428 operating under the program control of the computer 402 in accordance with control signals received over a line 430 from the HDA controller 418. The pin 422 is of smaller diameter than the hole 404 in the arm 28.

In order to ensure precision during servo writing, a reverse direction bias current is applied to the coil 34 of the rotary actuator. A precise step motor 432 having e.g. 25,000 steps per revolution rotates a lead screw 434 which is connected precisely to displace the lever 424 and thereby move the actuator arm 28 and heads 24 in very precise one third nominal track pitch steps throughout the range of tracks of the system 10. Step control signals are provided to the motor 432 over a line 436 from the HDA controller 418.

A cable 438 plugs the HDA controller 418 into the flex cable 40 extending into the HDA 12 which later provides for connections to the system 10 electronics, FIG. 6, thereby providing the servo writer 400 with electrical connections to the actuator coil 34 and to the heads 24 via the interface and head select circuit 36.

The servo control electronics 420 includes a computer interface 440 which interfaces an internal control, address and data bus 442 with like buses 444 of the computer 402. The interface 440 also includes appropriate address decode circuitry so that the servo writer 400 will be able to respond to commands from and return status information to the computer 402.

A control panel 446 includes operator controls and status displays so that an operator may manually supervise the servo writing process and monitor status of the operation.

A 30 MHz clock and synchronizer 448 is used to generate two clocks, a 30 MHz clock used in the timing equalization process with respect to the optical sector clock O, and a 15 MHz clock C used throughout the servo writer electronics 420. The optical sector clock O is phase synchronized to the 30 MHz reference clock by the synchronizer 448 within a 33 nanosecond latency.

An optical sector and qualification area counter and timer performs two functions. At the beginning of the servo writing operation, the time (distance) between each optical sector clock O edge is measured against the 30 MHz clock thirty two times, for each of the thirty two sectors. Typically, each measured time will vary slightly from the nominal 512 microsecond per sector. This is due to mechanical tolerances in the manufacturing process, and such factors as spindle motor jitter, runout of the spindle, etc. The total sum from the thirty two time measurements is then divided by the computer 402 by 32 to obtain an average sector time. This average value is then the nominal value for each sector, and the sum of all actual sector times will equal the sum of 32 average times. Next, the optical sector time for each sector is measured and stored in memory in the computer 402. A correction value is calculated, based on the difference between average sector time and actual sector time. This correction value is then loaded into a timer in the block 450 for each sector. When the timer counts out, it is time to begin writing the qualification area, and an appropriate control signal is thereupon sent to a qualification area and servo burst timers block 452. Whereas the time between an optical sector clock O edge and the start of the qualification area for the sector may vary for each of the thirty two sectors, the time (aerial track distance) for each sector equals the nominal value and is the same for every other sector.

The qualification area and servo burst timers generate timing edges appropriate to the writting of each qualification area pulse part and servo burst, in accordance with the FIG. 7 servo burst layout diagram. The data to be recorded in a particular servo burst is preloaded into a randome access memory 454 from memory of the computer 402. During the servo writting operation, the memory 454 is addressed by a servo address controller 456 operating under the control of the qualification area and servo burst timers 452. Parallel by bit, serial by word data is sent from the memory 454 into a data serializer 458 wherein the data is serialized and converted into a return-to-zero format for recording onto the data surface via the selected transducer 24. A write controller 460 inhibits writing operations except those which are appropriate for the particular track increment being recorded, it being understood that the head 24 will be stepped three times for each data track. Since only the qualification area and a single servo burst will be written in every increment, the write controller 460 prevents any other bursts from being overwritten during each servo writing track increment operation.

A Modulo 32 sector counter 462 counts each optical sector clock O edge and provides the count to the computer 402, so that it knows the sector number for the sector to be written. An HDA controller interface 464 includes drive and interface circuitry for connecting the interface controller 418 to the interface control electronics 420.

Each like servo burst for each sector is written sequentially to all data surfaces of the same "cylinder" or actuator position. Then, the servo writer 400 commands the precise step motor 432 to increment one third of a track pitch, and the data surfaces of the next cylinder are then written written with servo bursts in sequence. After all of the servo bursts have been written, the HDA 12 is connected to a test facility including the drive electronics, and proper servo operation is verified, and the first tier of factory defect management is carried out in a format operation. The HDA 12 is then mated with its electronics board 47 containing the FIG. 6 electronics, and operation of the integrated subsystem 10 is then verified at system checkout. The data storage subsystem 10 is then complete and ready for use by the customer.

Control Program for Microprocessor 102

In accordance with the control program routines resident in the ROM 104, the microprocessor 102 executes three principal blocks which are symbolized by the three circles drawn within the rectangle 102 in FIG. 6. In executing these blocks, look-up tables are used in preference to calculations, since retrieving parameters from a look-up table may be carried out much more rapidly than if the parameters were calculated in the arithmetic logic unit (ALU) of the microprocessor 102.

The first block 212 is called "Main Time" and this block 212 contains a collection of routines which include Power On Reset, Defect Management, and other necessary housekeeping routines, such as spindle motor speed monitoring, not directly related to head transducer position or the handling of commands and status words passing through the SCSI interface controller 110 between the subsystem 10 and the host computing environment within which the subsystem 10 is operating.

The second block 214 is a position interrupt service routine (POS_ISR) and is a high priority interrupt called at WEDGE time (FIG. 8) for each sector. This routine 214 is thus executed 32 times during each disk revolution, corresponding to the 32 servo sectors 52. This POS_ISR routine is responsible for controlling the pistion of the transducer heads 24 by operating the rotary actuator 30. This is true during both seeking and track following operations, as will be explained in greater detail.

The third block 216 is the SCSI interrupt service routine (SCSI_ISR) and is a low priority interrupt called whenever a command has been received through the interface controller 110 from the host.

In executing the control programs, the microprocessor 102 spends approximately the first 300 microseconds of every sector time interval in the POS-ISR routine 214. The remaining approximately 212 microseconds of each sector find the microprocessor in Main Time 212 doing housekeeping, defect management, etc., or merely waiting for a command interrupt, or responding to a command interrupt by executing the SCSI_ISR routine 216.

As already mentioned, one important routine of Main Time is the Power On Reset. During this routine, the microprocessor 102 commands the motor driver 136 to spin the disks 22 up to operating angular velocity (3662 RPM) by a signal over the control line 160. More speed is constantly monitored by the microprocessor 102 by timing a commutation signal received from the driver 136 over a line 162. If motor speed falls below a nominal value at any time during system operation, the microprocessor 102 takes the system 10 out of service by a status signal sent through the SCSI interface controller to the host computer.

Another initial routine is the Recalibration procedure. This procedure includes an adaptive determination of certain parameters of the subsystem 10 which may be unique to the particular device. Two NULL-I values are calculated, one for track seeking (also known as the "coast" actuator current value), and the other for track following (also called "servoing"). The NULL-I or null current values are current values which are applied to the rotary actuator 30 so that it does not move during servoing or so that it coasts at a constant angular velocity during seeking. These values are required as the flex circuit 42 applies a bias force to the actuator 30, and other characteristics of the actuator 30 may vary with time, temperature, and/or physical orientation of the subsystem 10.

Another adaptive value calculated during Power-On-Reset is a servo AGC value for each track. As is known, flux transition amplitudes vary as the head moves from an outer track to an inner track. The AGC value corrects for these read channel amplitude variations during servo time. The AGC value is put out to the read channel 124 from the DAC 125, as already explained.

An adaptive constant value KAG, explained hereinafter, is calculated for each head, and these values are stored in memory during Power-On-Reset.

In order to calculate the NULL-I, KAG and AGC values, the microprocessor 102 commands the actuator 30 to move the heads to physical cylinder location 829 and calculates the NULL-I value, KAG value and AGC value for that location. Then, the actuator 30 is commanded to physical cylinder location O, and the NULL-I, KAG and AGC values are calculated for track O. The microprocessor 102 then spreads the differences between the track 829 NULL-I and track O NULL-I values linearly over all of the intervening cylinder locations. The same linear spreading (slope) is carried out for the AGC values, and the slope values are stored in memory for use during subsequent operations of the subsystem 10.

During the track seeking operation, the coast NULL-I is also determined and recorded in a register by the microprocessor 102. Once the determination of the track O NULL-I and AGC values are completed and the slope is calculated and stored in memory, the subsystem 10 is ready to operate, and its on-line status is signalled to the host. Upon completion of the Recalibration routine in Main Time, the microprocessor 102 enters a loop, awaiting a WEDGE interrupt for POS_ISR or for a command interrupt for SCSI_ISR.

During the initial portion of Recalibration, default values are used for NULL-I, and the AGC values are acquired by a fast successive approximation, so that the microprocessor 102 is able to command movement to track 829 and to read the burst amplitudes and servo burst data bytes held in the data controller 106. The default value for NULL-I is 128, which represents a zero current midpoint of the 256 current steps capable of being commanded and put out by the DAC 120. The default value for AGC is determined empirically, based upon typical head and read channel characteristics at tracks 829 and O.

When a SCSI command interrupt occurs and the microprocessor 102 is in Main Time, the microprocessor leaves Main Time, by first pushing parameters from any uncompleted process onto the stack together with a return pointer and then enters the SCSI_ISR routine 216. The host command is brought into the microprocessor, decoded, and executed. If the command includes a seek, the microprocessor converts the logical block address from the SCSI interface into a physical sector location and preloads cylinder/head location and seek direction parameters into registers which will be accessed during execution of the POS_ISR routine. No seeking activity begins, however, until WEDGE time occurs, and the microprocessor 102 jumps to the POS_ISR routine 214.

It should be noted that a logical barrier exists between the POS_ISR routine 214 and the Main Time and SCSI$_{\_ISR\ routines}$ 212, 216. *This logical barrier is denoted by the dashed line across the block* 102 *of FIG.* 6. *When the microprocessor* 102 *is in the POS$\_$ISR routine, it does nothing else.* When the microprocessor 102 is in Main Time or SCSI_ISR, it does no actuator positioning; and, during these times, the position values are held in the DAC 120 until they are updated during the next WEDGE time when the microprocessor 102 again attends to the POS$_{\_ISR\ rou-}$ *tine. Thus, even during seeking operations, after the POS$\_$ISR routine* 214 has been completed and exited, the microprocessor 102 is free to execute e.g. defect management routines and carry on other housekeeping tasks, until the next WEDGE time arrives.

The POS_ISR routine 214 performs three tasks. Upon receipt of the WEDGE signal (FIG. 12), the microprocessor 102 exits whatever routine it was performing, saves appropriate values and enters the POS_ISR routine 214. First, it reads the amplitude values of the A, B, C and D bursts and records these values in registers. It then determines and records the identity of the burst with the largest amplitude.

Then, the program branches, in accordance with a seek flag. If this bit is set, the microprocessor 102 executes the seek routine, FIG. 17. If the bit is not set, then the microprocessor executes the servo routine, FIG. 18. After the selected routine is completed, the remainder of the POS$_{13}$ ISR routine 214 is taken up with housekeeping tasks. Then, the microprocessor 102 returns to Main Time and either awaits a command or resumes processing of any unfinished routine. At the arrival of the next WEDGE interrupt signal, the microprocessor leaves the Main Routine and once again executes POS_ISR.

Figure 17:
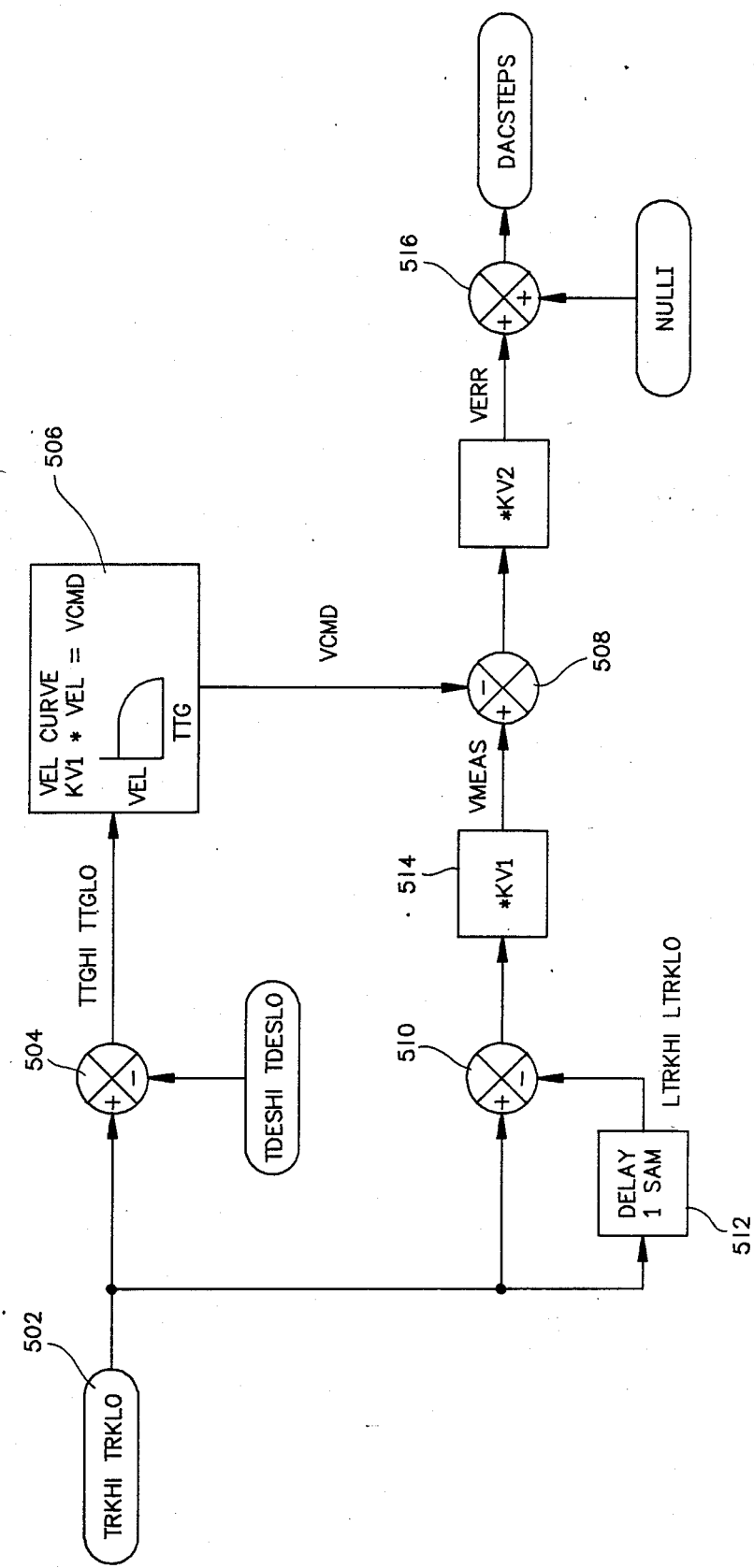
FIG. 17 is a program flow diagram for a portion of a microprocessor control program relating to track seeking operations of the disk file subsystem depicted in FIG. 1.

Seek Routine, FIG. 17

In carrying out the seek routine depicted in FIG. 17, the microprocessor 102 transfers the three bytes from the data controller 106 obtained from the largest amplitude burst just read at a node 502. These bytes include current track position number (2 bytes: TRKHI and TRKLO) and head or sector (see FIG. 11). A quick check sum is a calculated which is contained in the TRKHI byte in order to confirm the accuracy of the data read. If the data is valid, the number of tracks to go is then calculated, by subtracting at a node 504 the two byte track destination number TDESHI and TDESLO from the two byte track position number retrieved and verified at the node 502. In making this calculation the processor 102 takes the absolute destination value from the absolute present position value. The sign of the difference yields the direction of the seek. (The track destination number was prestored in a register in response to a command received during execution of the SCSI_ISR routine 216.)

Once the two byte tracks to go value has been calculated, a look-up table is entered at a node 506. This table represents values corresponding to a plot of velocity versus tracks to go. The result is extraction of a velocity command VCMD which enters a summing node 508.

Next, the present angular velocity of the actuator 30 is measured by a digital filtering operation including a summing junction 510 and a one sector delay 512. The track number read at the last sector LTRKHI, LTRKO is subtracted from the present track number TRKHI, TRKLO, and the difference is then multiplied by a constant KV1 at a multiply step 514. The product is the velocity measurement VMEAS. The velocity command VCMD is now subtracted from the velocity measurement VMEAS at the summing node 508 to yield a difference value.

The difference value is then multiplied by a second constant KV2 to produce an error value VERR. The predetermined, adaptive NULL-I (coast) value is added to the error value VERR at a node 516 to obtain the number of current steps to be commanded at the DAC 120, labelled DACSTEPS. The DASCTEPS value is then put out over the data bus and latched into the DAC 120 where it is converted to an analog current value to drive the actuator coil 34.

The KV1 and KV2 constants set the gain for the servo loop during seeking.

After putting out the DAC step value, the microprocessor 102 performs some housekeeping chores called ENDSEEK. It also checks to see if the actuator has settled: It looks at the number of tracks to go TTGHI, TTGLO. If this number is below low integer value, it switches to settling for the next sample. It then goes to the ENDPOSITION routine and thereupon exits POS_ISR.

Figure 18:
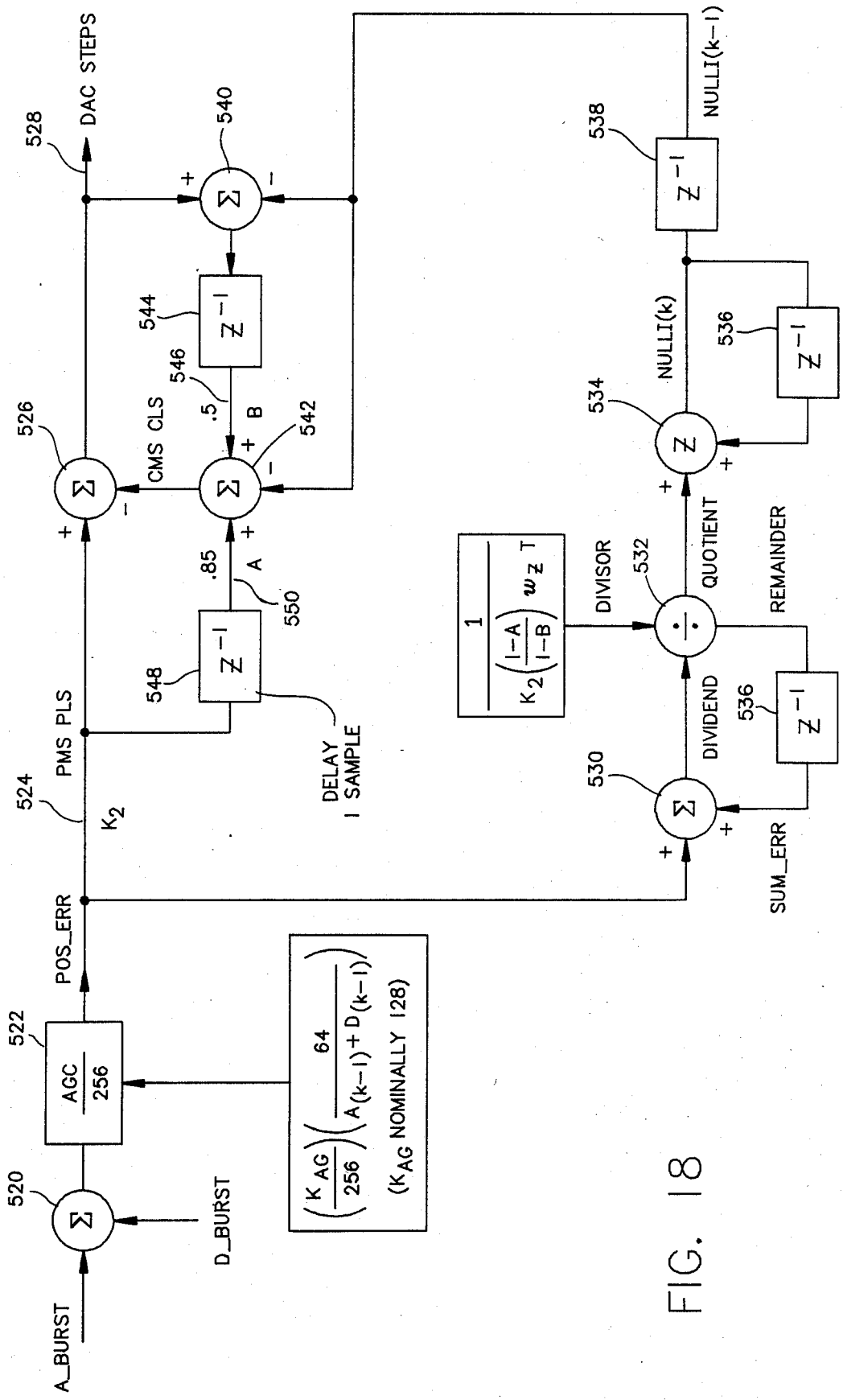
FIG. 18 is a program flow diagram for a portion of a microprocessor control program relating to track following (servoing) operations of the disk file subsystem depicted in FIG. 1.

Servo Routine, FIG. 18

Returning to Example I, FIG. 8B, the B burst is the largest burst. This actual phase of the four bursts is used in conbination with the desired phase in order to address a jump table having 16 possibilities, e.g. A-D, D-A, 32-(D-A), etc. Each of the possibilities provides the microprocessor with the program instructions appropriate to make a relative burst amplitude calculation between two of the four bursts. In Example I, the calculation is e.g. A-D in order for the head to servo over Track O. In Example II, the calculation is e.g. C-B in order for the head to servo Track 1. In Example III, the calculation is D-A in order for the head to servo over Track 2, and is 32-(D-A) in order for the head to servo to Track 3.

The actual difference calculation is performed by the microprocessor 102 at a node 520 (FIG. 18). Next, an AGC value is multiplied by the resulting difference at a node 522. The AGC value is calculated for the current sector. The AGC calculation is $$\frac{Kag}{256}\left(\frac{64}{A+D}\right)$$

KAG, mentioned above, is an adaptive constant and is nominally set for 128. This calculation is carried out by reference to a look-up table in order to speed up the process. The resultant value is a position error value, POS_ERR.

The position error value POS_ERR is then multipled by a gain constant K2 at a node 524 in order to set loop gain for the servo in the track following (servoing) mode. The resultant product is a two byte number PMS. PLS.

A previously calculated two byte value, CMS, CLS which was derived from information obtained at the last sector is subtracted from the current product PMS, PLS at a summing junction 526 to yield the actual digital number of digital to analog converter steps, DAC STEPS, required to move the transducer to maintain track centerline alignment with the track being followed. DAC STEPS is put out by the microprocessor at a program node 528 over the data bus 150 to the DAC 120 wherein the DAC STEPS is latched converted into an analog value applied to the actuator driver 122. The actual processing time required from the midpoint between bursts B and C of the present sector until the new value is applied to the actuator driver 122 is approximately 100 microseconds.

Now that the microprocessor 102 has completed the position calculation for the present sector, it is free to perform certain required housekeeping tasks, such as calculating a new value for CMS, CLS for the next sector. It also must adaptively update the Null-I value. In this regard, if the POS_ERR signal is equal to zero, then Null-I does not change. If POS_ERR is unequal to zero, than an integration occurs.

The POS_ERR signal is summed with a SUM_ERR value at a node 530. The resultant is then divided by a value at a node 532. If the quotient is a whole integer, it is summed with the last value of Null-I at a summing junction 534. If the quotient is less than a whole integer, or greater than a whole integer but having a remainder, the remainder is delayed by one sector time $Z^{-1}$ at a node 536 to produce the SUM_ERR value which is added at the integrating node 530.

The Null-I value put out from the summing node 534 (Null-I(k)) is delayed by one sector time at a $Z^{-1}$ node 536 to produce the value added to the quotient at the node 534. Another one sector time delay $Z^{-1}$ is applied to the Null-I(k) value at a node 538 to produce a value Null-I(k−1). This value is applied to two summing junctions 540 and 542 in the main program path.

In the first junction 540, the Null-I(k−1) value is subtracted from the most recent DAC STEPS value, and the difference is then given a one sector time delay by a delay node $z^{-1}$ 544 and then multiplied by a constant amplitude value (0.5) at a node 546 to yield a first product. The PMS, PLS value is given a one sector time delay at a $Z^{-1}$ delay node 548 and then multiplied by a constant amplitude value (0.85) at a node 550 to yield a second product. The first product and the second product are summed at the junction 542 and the Null-I(k−1) value is subtracted from the sum at this junction 542. The resultant two byte value is CMS, CLS for the next sector. This value is held until the next sector is reached and the servo routine is repeated.

The divisor applied at the division node 532 is a fraction:

$$\frac{1}{K2\left(\frac{1-A}{1-B}\right)(W_zT)}$$

where $W_zT$ is the rate of change of the Null-I value.

After the completion of the update routines, the Servo routine depicted on FIG. 18 ends, and the program returns to the main position routine POS_ISR and carries on the ENDPOSITION routines as were carried out after completion of the seeking routine (FIG. 17) already described. Then, the program returns to Main Time and resumes other tasks relating to commands, defect management, etc.

Having thus described a presently preferred embodiment of the invention, it will now be appreciated that the objects of the invention have been fully achieved, and it will be understood by those skilled in the art that the presentation of the preferred embodiment is by way of illustration and example only and is not intended to be limiting in any sense thereof. The scope of the invention is as set forth in the following claims.

Although the presently preferred embodiment has been presented in conjunction with a half height five and one quarter inch non-removable disk Winchester technology disk drive using sputtered thin film storage media, many varying embodiments and applications of the principles of the present invention will be readily apparent to those skilled in the art. For example, removable and non-removable floppy and rigid disks of larger or smaller diameter may be used with equal success. Performance of optical disk and linear media storage systems may be substantially improved and enhanced by application of described principles of the present invention.

We claim:

1. A high performance, low cost rotating disk data storage subsystem, the subsystem including:
a head and disk assembly comprising a storage disk rotatable at a controlled angular velocity and defining a series of preformatted concentric data tracks having a plurality of sectors in the data tracks including a servo portion at the beginning of each sector, said servo portion containing a prerecorded pattern of a plurality of repeating, time staggered, non-phase-coherent bursts, each burst having a predetermined integral fraction radial offset relative to the other bursts, each burst containing a constant frequency preamble field followed by a unique value field related to its burst spatial location, head means being positionable relative to said tracks in response to information derived from at least a servo portion for reading data on said disk including the servo bursts and for writing user data,
a programmed microcontroller supervisor for receiving operational data storage and retrieval commands from a host system with which the subsystem is operationally associated and for controlling the position of the head means during track seeking and following operations in response to servo information read by the head means from each servo portion and further in response to the commands,
interface means under the control of said microcontroller supervisor for receiving the commands and data blocks from the host system and for sending commands, status words and data blocks to the host system,
data sequencer and memory controller means under the control of said microcontroller supervisor for managing flow of data blocks to and from the disk via the head means, for formatting data for storage and retrieval, for verifying the integrity of and correcting errors in data retrieved from the disk and for storing the information read by the head means from said unique value fields for subsequent processing by the microcontroller supervisor.

2. The disk data storage subsystem set forth in claim 1 wherein said head means is carried upon a damped, low mass compact in-line head assembly operated by an electromechanical rotary actuator.

3. The disk data storage subsystem set forth in claim 1 wherein there are four bursts in each servo portion in which read preamble field amplitudes are in quadrature relationship and including a first burst in each servo portion offset outwardly from a track centerline by one outward fractional increments, a second burst offset from the track centerline by zero fractional increments, a third burst offset from the track centerline by two outward fractional increments, and a fourth burst offset from track centerline by one inward fractional increment.

4. The disk data storage subsystem set forth in claim 3 wherein the fractional radial increment is one third track pitch.

5. The disk data storage subsystem set forth in claim 1 further including a timer connected to the head means and wherein a servo portion includes at least one quasi-phase-coherent qualification area carrying prerecorded timing information readable by said head means and processed by said timer for synchronizing subsystem timing signals generated by the timer,
the qualification area containing at least one timing transition separated by direct current erase gaps of predetermined duration, the transition and gaps being prerecorded contemporaneously with one of the servo bursts, there being at least one timing transition recorded for every other servo burst,
all timing transitions of the qualification area being in substantial time alignment and radial spatial alignment with each other on the disk surface.

6. The disk data storage subsystem set forth in claim 5 wherein the qualification area includes two timing transitions recorded for the sector burst, said transitions being in circumferential spaced apart relation, separated by direct current erase gaps of predetermined duration.

7. The data storage subsystem set forth in claim 5 wherein the timer includes counters for counting erase gap times in order to determine that the qualification area is valid and thereupon to put out a real sector marker signal to the microcontroller, and to put out a virtual sector marker signal to the microcontroller timed from the last real sector marker whenever a qualification area is not determined to be valid.

8. The data storage subsystem set forth in claim 5 wherein each sector includes a said qualification area.

9. The data storage subsystem set forth in claim 1 further including an amplitude sensing circuit for sensing relative amplitudes of said preamble fields of said servo bursts, the amplitude sensing circuit comprising:
amplifier means for amplifying transitions read by the data transducer,
sign elimination means connected to the amplifier means for removing the sign of each transition and for providing the absolute amplitude value thereof,
integrator means connected to the sign elimination means for integrating the absolute amplitude values of consecutive transitions of a burst over the time interval thereof to yield and hold an integral value,
analog to digital conversion means connected to the integrator means for converting each integral value into a digital word,
reset means connected to the integrator means for resetting the integrator to zero after each integral value has been acquired by the analog to digital conversion means and before the next burst whose amplitude is to be determined begins.

10. The disk data storage subsystem set forth in claim 1 in which said servo bursts are produced by the method including the steps of:

sensing an annular pattern of alternating light opaque and light reflective areas on a spindle hub of the storage disk of the subsystem, there being an even integer relationship between the number of areas and the number of servo sectors to be written, calculating equal time intervals for the servo sectors by summing the times between sensed light changes between opaque and light areas of the hub over one revolution thereof and by dividing the sum by the number of sectors to be written, calculating a correction factor for correcting the time between the actual sensed light change for a sector and a nominal sector starting time for equal sector times, physically engaging the electromechanical actuator with a precision positioning mechanism, adjusting the mechanism to a first concentric radial location on the disk and thereupon writing the servo information for that radial location with the transducer head, thence causing the mechanism to move to each next radial location and writing the servo information with the transducer head for each next radial location until all servo patterns have been written, and withdrawing the positioning mechanism from engagement with the actuator.

11. The disk data storage subsystem set forth in claim 1 wherein said microcontroller supervisor includes program firmware means:

for executing a head position routine during a predetermined one portion of each sector time by obtaining and processing relative amplitude values from the amplitude measuring circuit and obtaining absolute position information from the data sequencer and memory controller means to derive head position control and correction signals, and for applying the signals to control the head positioner during a portion of the duration of the sector as an interrupt in all other processing activity; and, for processing of other activity during a predetermined other portion of each sector time including at least one of: receiving operational data storage and retrieval commands from a host system, correlating logical block addresses with physical sector locations, checking spindle speed to ascertain proper angular velocity of the data storage disk, putting out status words to the host system and waiting in a non-processing state until occurrence of the next sector is detected.

12. The data storage subsystem set forth in claim 11 wherein the head positioner comprises a continuously variable voice coil actuator, and further including a first digital to analog converter connected to the microcontroller to receive the head position control and correction signals as digital words and to convert the words into analog control and correction values, a driver amplifier connected to receive the analog control and correction values and to drive the voice coil actuator thereby to control radial position of the head transducer relative to the disk.

13. The data storage subsystem set forth in claim 1 wherein the microcontroller supervisor is connected to control the gain of the read channel during the times that the transducer head passes over and reads the servo bursts of each sector.

14. The data storage subsystem set forth in claim 13 further comprising a second digital to analog converter connected to receive digital gain control values from the microcontroller and to provide analog control values to control gain of the read channel.

15. The data storage subsystem set forth in claim 1 wherein the disk is clamped to a rotating spindle by a clamp having an annular pattern of alternating light opaque and light reflective areas of a number related to the number of sectors formed on the disk, the pattern facilitating writing of the servo pattern on the disk during formatting operations in the manufacturing process for the subsystem.

16. The data storage subsystem set forth in claim 1 including at least one spare track location on the disk and wherein said microcontroller employs program means to carry out a defect management routine, said program means:

for generating and storing an in-line defect map in a memory for all media defects encountered during manufacturing of the subsystem in which the logical block address of a physical sector containing a media defect is assigned in the map to the next in-line physical sector;

for generating and storing in the memory a field defect map for all media defects first encountered after manufacture and during use of the device in which the logical block address of a sector containing a media defect is assigned in the map to the physical address location of a spare sector reserved on a data surface in accordance with a predetermined replacement sector location priority;

for reassigning in the field defect map the logical block addresses of the sectors of a data track having a defect in the qualification preamble area of one or more of said sectors first encountered after manufacture and during use of the subsystem to the physical addresses of the sectors of the spare track; and for causing the microcontroller automatically to consult the in-line and field defect maps to correlate each logical block address with each physical sector location incident to each sector access during data read and write operations of the subsystem and for causing a replacement sector to be accessed in lieu of a replaced sector in accordance with the information stored in the in-line and field defect maps.

17. The data storage subsystem set forth in claim 16 wherein said program means for said defect management routine further includes means for using at least one spare sector reserved at the same radial data track position unless previously used; then using at least one spare sector reserved at an adjacent radial data track position unless previously used; then using at least one sector reserved at a next adjacent radial data track position unless previously used;

whereby the radially nearest available spare sector is located and used automatically in place of a sector determined to contain a media defect.

18. A prerecorded pattern of servo information for a data storage device including a storage medium defining a series of data tracks and at least one area containing said prerecorded pattern of servo information, head means moveable relative to said tracks for reading data on said medium including said servo information, and a servo system including said head means and responsive to servo information read by said head means and to externally supplied data track select commands in order to move said head means from a departure track to a destination track during track seeking operations of the device and to maintain said head means in substantial alignment with the centerline of a selected data track during track following operations of the device, said pattern in the area comprising:

a plurality of repeating, time staggered, non-phase-coherent bursts, each burst having a predetermined integral fraction spatial offset relative to the other bursts of a value less than one half track width in a dimension substantially perpendicular to centerlines of the tracks and each burst containing a unique value related to its spatial location, during track following operations of said device relative amplitudes of a first combination of some of the time staggered bursts being readable by the head means for providing track centerline correction information for a particular track being followed, and relative amplitudes of a second combination of some of the time staggered bursts being readable by the head means for providing quadrature information relative to the first combination, the first and second combinations being determined by the servo system in relation to the track being followed, and during track seeking operations of said device at least one burst being readable by said head means when it is adjacent said area in order to provide absolute data track identification to said servo system from said unique value, thereby enabling said servo system to ascertain absolute physical location of the head means during the seeking operation.

19. A prerecorded repeating pattern of servo information for a rotating disk data storage device including a storage disk defining a series of concentric data tracks and a plurality of servo sectors embedded in said data tracks in substantially equally spaced apart relation, each sector containing said prerecorded pattern of servo information, head means movable relative to said tracks for reading data on said disk including said servo information, and a servo system including said head means and responsive to servo information read by said head means and to externally supplied data track select commands in order to move said head means from a departure track to a destination track during track seeking operations of the device and to maintain said head means in substantial alignment with the centerline of a selected data track during track following operations of the device, said pattern in said sector comprising:

four time staggered, non-phase-coherent bursts, each burst having a predetermined integral fraction radial spatial offset relative to the other bursts of a value less than one half track width, and each burst containing a unique value related to its spatial location, the pattern repeating itself beginning every fourth track, during track following operations of said device relative amplitudes of a first combination of some of the time staggered bursts being readable by the head means for providing track centerline correction information for a particular track being followed, and relative amplitude of a second combination of some of the time staggered bursts being readable by the head means for providing quadrature information relative to the first combination, the first and second combinations being determined by the servo system in relation the track being followed, and during track seeking operations of said device at least one burst being readable by said head means when it is adjacent a said sector in order to provide absolute data track identification to said servo system from said unique value, thereby enabling said servo system to ascertain absolute physical location of the head means as it passes over each sector during the seeking operation.

20. The servo pattern set forth in claim 19 wherein a first burst in the pattern is offset outwardly from a track centerline by one outward fractional increments, a second burst is offset from the track centerline by zero fractional increments, a third burst is offset from the track centerline by two outward fractional increments, and a fourth burst is offset from track centerline by one inward fractional increment.

21. The servo pattern set forth in claim 20 wherein the fractional increment is one third track pitch.

22. A quasi-phase-coherent qualification area carrying prerecorded timing information for a servo system in a rotating disk data storage device, the device including a storage disk defining a series of concentric data tracks having at least one servo sector in the data tracks, said sector containing the prerecorded pattern of servo information and immediately preceded by the qualification area, the device including head means movable relative to said tracks for reading data on said disk including said qualification area and the servo information, the servo system including said head means responsive to the timing information in the qualification area and servo information and to externally supplied data track select commands in order to move said head means from a departure track to a destination track during track seeking operations of the device and to maintain said head means in substantial alignment with the centerline of a selected data track during track following operations of the device, the prerecorded servo pattern including a plurality of time staggered, non-phase-coherent bursts, each burst having a predetermined integral fraction radial spatial offset relative to the other bursts of a value less than one half track width in a dimension substantially perpendicular to centerlines of the tracks, the qualification area containing at least one timing transition separated by direct current erase gaps of predetermined duration, the transition and gaps being prerecorded contemporaneously with a non-phase-coherent servo burst, there being at least one timing transition recorded for every other servo burst, all timing transitions being in substantial time alignment and radial spatial alignment with each other.

23. The qualification area defined by claim 22 wherein there are two timing transitions recorded for a sector burst, said transitions being in circumferential spaced apart relation, separated by direct current erase gaps of predetermined duration.

24. The qualification area defined by claim 23 wherein said integral fraction spatial radial offset between servo bursts is one third track pitch.

25. The qualification area defined by claim 22 wherein said servo system includes counter means responsive to the occurrences of the timing transitions and durations of the erase gaps of the qualification area so that the time staggered servo bursts may be properly time sampled.

26. An amplitude sensing circuit for sensing relative amplitudes of a prerecorded pattern of radially offset servo bursts in a rotating disk data storage system, there being a plurality of bursts radially offset in both directions with respect to a centerline of each concentric data track, each burst containing a field of constant frequency transitions readible by a data transducer, the amplitude sensing circuit comprising:

amplifier means for amplifying transitions read by the data transducer, sign elimination means connected to the amplifier means for removing the sign of each transition and for providing the absolute amplitude value thereof, integrator means connected to the sign elimination means for integrating the absolute amplitude values of consecutive transitions of a burst over the time interval thereof to yield and hold an integral value, analog to digital conversion means connected to the integrator means for converting each integral value into a digital word, reset means connected to the integrator means for resetting the integrator to zero after each integral value has been acquired by the analog to digital conversion means and before the next burst whose amplitude is to be determined begins.

27. A method for writing a sector servo pattern upon a rotating magnetic media storage disk of a data storage device with a transducer head associated with the disk and moveable by an electromechanical actuator to be controlled by the pattern to be written, the servo writing method including the steps of:

sensing an annular pattern of alternating light opaque and light reflective areas on a hub of the disk, there being an even integer relationship between the number of areas and the number of servo sectors to be written, calculating equal time intervals for the servo sectors by summing the times between sensed light changes between opaque and light areas of the hub over one revolution thereof and by dividing the sum by the number of sectors to be written, calculating a correction factor for correcting the time between the actual sensed light change for a sector and a nominal sector starting time for equal sector times, physically engaging the electromechanical actuator with a precision positioning mechanism, adjusting the mechanism to a first concentric radial location on the disk and thereupon writing the servo information for that radial location with the transducer head, thence causing the mechanism to move to each next radial location and writing the servo information with the transducer head for each next radial location until all servo patterns have been written, and withdrawing the positioning mechanism from engagement with the actuator.

28. The method set forth in claim 27 wherein said step of physically engaging the electromechanical actuator with a precision positioning mechanism includes the step of energizing a coil of the actuator to provide a reverse bias force against the positioning mechanism, and wherein the step of withdrawing the positioning mechanism from engagement with the actuator includes the step of withdrawing actuator current.

29. Servo writing apparatus for writing sector servo information on a rotating magnetic media data storage disk of a head and disk assembly for a data storage device, the assembly including a data transducer device to be moved during operation thereof by an electromechanical voice coil actuator, the storage disk having a disk clamp for clamping the disk to a rotating spindle and including an annular pattern of alternating light opaque and light reflective areas of a number related to the number of sectors to be written, the servo writing apparatus comprising:

electro-optical sensor means for sensing the annular pattern of alternating light opaque and light reflective areas on the disk clamp, and for putting out an electrical signal representative thereof, programmed digital processor means connected to receive the electrical signal, for calculating equal time intervals for the servo sectors by summing the times between sensed light changes between opaque and light areas of the disk clamp over one revolution thereof and by dividing the sum by the number of sectors to be written, and for calculating a correction factor for correcting the time between the actual sensed light change for a sector and a nominal sector starting time for equal sector times, timer means connected to the digital processor and to the electro-optical sensor means for generating timing signals for writing each sector servo information, a precision mechanism positionable under the control of the digital processor for physically engaging the electro-mechanical actuator and for adjusting the mechanism to each concentric radial location on the disk, actuator current supply means under the control of the digital processor for energizing a coil of the actuator to provide a reverse bias force against the positioning mechanism, servo information writing means in connection with the transducer head and controlled by the timer means for writing the servo information for each radial location with the transducer head.

30. A method for managing defects encountered in data sectors of sectorized, concentric data storage tracks of a rotating disk data storage device including a programmed supervisory digital controller for controlling the position of a data transducer for reading the data in each sector, and wherein the sectors of the tracks include a qualification preamble area for controlling the timing of reading of the sectors, and wherein the device further includes at least one spare track location, the method comprising the steps of:

a. generating and storing an in-line defect map for all media defects encountered during manufacturing of the device in which the logical block address of a physical sector containing a media defect is assigned in the map to the next in-line physical sector;

b. generating and storing a field defect map for all media defects first encountered after manufacture and during use of the device in which the logical block address of a sector containing a media defect is assigned in the map to the physical address location of a spare sector reserved on a data surface in accordance with a predetermined replacement sector location priority;

c. reassigning in the field defect map the logical block addresses of the sectors of a data track having a defect in the qualification preamble area of one or more of said sectors first encountered after manufacture and during use of the device to the physical addresses of the sectors of the spare track;

d. causing the digital controller automatically to consult the in-line and field defect maps to correlate each logical block address with each physical sector location incident to each sector access during data read and write operations of the device, and causing a replacement sector to be accessed in lieu of a replaced sector in accordance with the information stored in the in-line and field defect maps.

31. The method for managing defects set forth in claim 30 wherein said predetermined replacement sector location priority comprises in order:

using at least one spare sector reserved at the same radial data track position unless previously used; then using at least one spare sector reserved at an adjacent radial data track position unless previously used; then using at least one sector reserved at a next adjacent radial data track position unless previously used;

whereby the radially nearest available spare sector is located and used automatically in place of a sector determined to contain a media defect.

32. A method for operating a single programmed microcontroller for controlling a high performance, low cost rotating disk data storage subsystem, the subsystem including a head and disk assembly comprising a storage disk rotatable at a controlled angular velocity and defining a series of preformatted concentric data tracks having a plurality of sectors in the data tracks including a servo portion in each sector, said servo portion containing a prerecorded pattern of bursts, each burst containing a unique value related to its spatial location, head means being moveable relative to said tracks for reading data on said disk including said servo bursts, interface means under the control of said microcontroller for receiving the commands and data blocks from the host system and for sending status words and data blocks to the host system, and data sequencer and memory controller means under the control of said microcontroller supervisor for managing flow of data blocks to and from the disk via the head, for formatting data for storage and retrieval, and for verifying the integrity of, and correcting errors in data retrieved from the disk, detecting the occurrence of each sector and thereupon executing a head position routine by obtaining and processing position information from said servo bursts, and applying updated position information to control the position of said head means during a first portion of the duration of the sector as an interrupt in all other processing activity, and returning to processing of other activity at the completion of the head position routine during the remainder of the duration of the sector, including at least one of: receiving operational data storage and retrieval commands from a host system, correlating logical block addresses with physical sector locations, checking spindle speed to ascertain proper angular velocity of the data storage disk, putting out status words to the host system and waiting in a non-processing state until occurrence of the next sector is detected.

33. A high performance, low cost rotating disk data storage subsystem, the subsystem including:

a head and disk assembly comprising at least one storage disk rotatable at a controlled angular velocity and defining a series of preformatted concentric data tracks having a plurality of sectors in the data tracks, each sector including a servo portion and a user data portion for storing data encoded in accordance with a predetermined zero run length limited, variable length code, said servo portion containing a prerecorded pattern of a plurality of repeating, time staggered bursts, each burst having a predetermined radial offset relative to the other bursts and each burst containing a constant frequency preamble and a unique positional value encoded in accordance with said code for identifying its absolute spatial location, the burst preambles having amplitudes in quadrature relationship, and a data transducer head radially positionable among the concentric data tracks by actuation of a head positioner in order to read user data blocks and servo information and in order to write user data blocks, a timer for generating timing signals related to the layout of servo bursts and user data in each sector, a programmed microcontroller operationally controlled by the timer for receiving operational data storage and retrieval commands from a host system and for controling the head positioner during track seeking and following operations in response to servo information sampled from each servo portion and further in response to the commands, a single read channel connected to the head transducer for shaping flux transitions detected during passage of the head over the storage surface into logic level transitions, an amplitude sampling circuit connected to the head transducer and controlled by the timer for sampling in sequence the analog amplitudes of the preambles of the bursts of a sector and for converting each sample into a digital value and sending the value to the microcontroller, data sequencer and memory controller means connected to the read channel under the control of the microcontroller for receiving and storing each absolute positional value read from each servo burst for subsequent access and use by the microcontroller, for managing flow of user data blocks to and from the disk via the head, for encoding and decoding user data in accordance with said code during storge and retrieval, and for verifying the integrity of, and correcting errors in data retrieved from the disk, interface means under the control of the microcontroller for receiving the commands and data blocks from the host system and for sending status words and data blocks to the host system.

34. The data storage subsystem set forth in claim 33 wherein said microcontroller includes program firmware means:

for executing a head position routine during a predetermined one portion of each sector time by obtaining and processing relative amplitude values from the amplitude measuring circuit and obtaining absolute position information from the data sequencer and memory controller means to derive head position control and correction signals, and for applying the signals to control the head positioner as an interrupt in all other processing activity; and, for processing of other tasks during a predetermined other portion of each sector time including at least one of: receiving operational data storage and retrieval commands from the host system, correlating logical block addresses with physical sector locations, checking spindle speed to ascertain proper angular velocity of the data storage disk, putting out status words to the host system and waiting in a non-processing state until occurrence of the next sector is detected.

35. The data storage subsystem set forth in claim 33 wherein the head positioner comprises a continuously variable voice coil actuator, and further including a first digital to analog converter connected to the microcontroller to receive the head position control and correction signals as digital words and to convert the words into analog control and correction values, a driver amplifier connected to receive the analog control and correction values and to drive the voice coil actuator thereby to control radial position of the head transducer relative to the disk.

36. The data storage subsystem set forth in claim 35 wherein the microcontroller is connected to control the gain of the read channel during the times that the transducer head passes over and reads the servo bursts of each sector.

37. The data storage subsystem set forth in claim 36 further comprising a second digital to analog converter connected to receive digital gain control values from the microcontroller and to provide analog control values to control gain of the read channel.

38. The data storage subsystem set forth in claim 33 wherein the amplitude measuring circuit comprises:
   amplifier means for amplifying transitions read by the data transducer,
   sign elimination means connected to the amplifier means for removing the sign of each transition and for providing the absolute amplitude value thereof,
   integrator means controlled by the timer and connected to the sign elimination means for integrating the absolute amplitude values of consecutive transitions of a burst over the time interval thereof to yield and hold an integral value,
   analog to digital conversion means controlled by the timer and connected to the integrator means for converting each integral value into a digital word,
   reset means controlled by the timer and connected to the integrator means for resetting the integrator to zero after each integral value has been acquired by the analog to digital conversion means and before the next burst whose amplitude is to be determined begins.

39. The data storage subsystem set forth in claim 33 wherein each sector includes four time staggered, non-phase-coherent bursts, each burst having a predetermined integral fraction radial spatial offset relative to the other bursts of a value less than one half track width, and each burst containing a unique value related to its spatial location, the pattern repeating itself beginning every fourth track.

40. The data storage subsystem set forth in claim 33 wherein the timer is connected to the read channel and further including at least quasi-phase-coherent qualification area carrying prerecorded timing information for synchronizing timing signals generated by the timer,
   the qualification area containing at least one timing transition separated by direct current erase gaps of predetermined duration, the transition and gaps being prerecorded contemporaneously with one of the servo bursts, there being at least one timing transition recorded for every other servo burst,
   all timing transitions of the qualification area being in substantial time alignment and radial spatial alignment with each other on the disk surface.

41. The data storage subsystem set forth in claim 40 wherein the qualification area includes two timing transitions recorded for the sector burst, said transitions being in circumferential spaced apart relation, separated by direct current erase gaps of predetermined duration.

42. The data storage subsystem set forth in claim 40 wherein the timer includes counters for counting erase gap times in order to determine that the qualification area is valid and thereupon to put out a real sector marker signal to the microcontroller, and to put a virtual sector marker signal to the microcontroller timed from the last real sector marker whenever a qualification area is not determined to be valid.

43. The data storage subsystem set forth in claim 40 wherein each sector includes a said qualification area.

44. The data storage subsystem set forth in claim 33 wherein the head positioner includes a damped, low mass compact in-line head assembly operated by an electromechanical rotary actuator.

45. The data storage subsystem set forth in claim 34 including at least one spare track location on the disk and wherein said program firmware means further enables said microcontroller to carry out a defect management routine during said other portion of sector time and includes program means:
   for generating and storing an in-line defect map in a memory for all media defects encountered during manufacturing of the subsystem in which the logical block address of a physical sector containing a media defect is assigned in the map to the next in-line physical sector;
   for generating and storing in the memory a field defect map for all media defects first encountered after manufacture and during use of the device in which the logical block address of a sector containing a media defect is assigned in the map to the physical address location of a spare sector reserved on a data surface in accordance with a predetermined replacement sector location priority;
   for reassigning in the field defect map the logical block addresses of the sectors of a data track having a defect in the qualification preamble area of one or more of said sectors first encountered after manufacture and during use of the subsystem to the physical addresses of the sectors of the spare track; and
   for causing the microcontroller automatically to consult the in-line and field defect maps to correlate each logical block address with each physical sector location incident to each sector access during data read and write operations of the subsystem and for causing a replacement sector to be accessed in lieu of a replaced sector in accordance with the information stored in the in-line and field defect maps.

46. The data storage subsystem set forth in claim 45 wherein said program means for said defect management routine further includes means for using at least one spare sector reserved at the same radial data track position unless previously used; then using at least one spare sector reserved at an adjacent radial data track position unless previously used; then using at least one sector reserved at a next adjacent radial data track position unless previously used;

whereby the radially nearest available spare sector is located and used automatically in place of a sector determined to contain a media defect.

47. In a servo system for monitoring and controlling head position in a rotating disk data storage device including at least one storage disk and defining a series of preformatted concentric data tracks having a plurality of sectors in each track, each sector including a qualification area, a servo portion and a user data portion, the servo portion containing a prerecorded pattern of a plurality of radially repeating, time staggered bursts, each burst having a predetermined radial offset relative to the other bursts of the same sector, and a data transducer head radially positionable among the concentric data tracks under servo system control, a timer for generating timing signals for enabling the servo system to select and process position information provided by the bursts, the timer including:

a system clock for generating clocking pulses, an up counter initiated by a trigger pulse for counting from zero to a count corresponding to the number of clocking pulses occurring during a sector interval, a down counter preloaded with the actual count reached by the up counter in response to a trigger signal and for counting down clocking pulses toward zero during a sector interval, qualification area testing means for testing the validity of a qualification area and for generating and putting out an actual trigger pulse upon validation of the particular qualification area being tested, and for generating and putting out a virtual trigger pulse when the down counter reaches a zero count in the event that the particular qualification area being tested is not validated.

48. The timer set forth in claim 47 wherein the qualification areas contain at least one timing transition separated by direct current erase gaps of predetermined duration, and wherein the qualification area testing means includes a counter for counting clocking pulses during the duration of each erase gap to enable determination whether the actual count reached corresponds to the predetermined duration of the gap.

49. A high performance, low cost rotating disk data storage subsystem, the subsystem including:

a head and disk assembly comprising a storage disk rotatable at a controlled angular velocity and defining a series of preformatted concentric data tracks having a plurality of sectors in the data tracks including a servo portion in each sector, said servo portion containing a prerecorded pattern of bursts each containing a unique value related to its absolute physical position, head means being positionable relative to said tracks in response to information derived from at least a servo portion for reading data on said disk including the servo bursts and for writing user data, a single programmed microcontroller supervisor for receiving operational data storage and retrieval commands from a host system with which the subsystem is operationally associated and for controlling the position of the head means during track seeking and following operations in response to servo information read by the head means from each servo portion and further in response to the commands, interface means under the control of said microcontroller supervisor for receiving the commands and data blocks from the host system and for sending commands, status words and data blocks to the host system, data sequencer and memory controller means under the control of said microcontroller supervisor for managing flow of data blocks to and from the disk via the head means, and for also acquiring and storing positional information read from said bursts by the same head means for subsequent use and processing by said microcontroller supervisor.

50. The data storage subsystem set forth in claim 49 wherein said microcontroller supervisor responds in accordance with program firmware means;

for executing a head position routine during a predetermined one portion of the duration of each sector by obtaining and processing relative amplitude values of said bursts and obtaining absolute position information stored by the data sequencer and memory controller means in order to derive head position control and correction signals, and for applying the signals to control the head positioner, and for processing of other tasks during a predetermined other portion of each sector time including at least one of: receiving operational data storage and retrieval commands from a host system, correlating logical block addresses with physical sector locations, checking spindle speed to ascertain proper angular velocity of the data storage disk, putting out status words to the host system and waiting in a non-processing state until occurrence of the next sector is detected.

51. The data storage subsystem set forth in claim 50 wherein the microcontroller supervisor responds to the program means during during the predetermined one portion of the duration of each sector as an interrupt in all other processing activity.

52. The data storage subsystem set forth in claim 33 wherein the disk is clamped to a rotating spindle by a clamp having an annular pattern of alternating light opaque and light reflective areas of a number related to the number of sectors formed on the disk, the pattern facilitating writing of the servo pattern on the disk during formatting operations in the manufacturing process for the subsystem.

* * * * *